US012561247B2

(12) United States Patent
Liu et al.

(10) Patent No.: US 12,561,247 B2
(45) Date of Patent: Feb. 24, 2026

(54) DEVICE DATA PROCESSING USING SHARED MEMORY POOL

(71) Applicant: Huawei Cloud Computing Technologies Co., Ltd., Guizhou (CN)

(72) Inventors: Xiao Liu, Shanghai (CN); Zhou Yu, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 18/771,430

(22) Filed: Jul. 12, 2024

(65) Prior Publication Data

US 2024/0362165 A1     Oct. 31, 2024

Related U.S. Application Data

(63) Continuation of application No. PCT/CN2023/071994, filed on Jan. 13, 2023.

(30) Foreign Application Priority Data

Jan. 14, 2022     (CN) ......................... 202210041883.5
Jul. 8, 2022     (CN) ......................... 202210801224.7

(51) Int. Cl.
G06F 12/0817          (2016.01)

(52) U.S. Cl.
CPC .... G06F 12/0828 (2013.01); G06F 2212/621 (2013.01)

(58) Field of Classification Search
CPC ....................... G06F 12/0828; G06F 2212/621

USPC ......................................................... 711/141
See application file for complete search history.

(56) References Cited

U.S. PATENT DOCUMENTS

| | | | |
|---|---|---|---|
| 9,760,527 B2 | 9/2017 | Egi et al. | |
| 11,675,520 B2 * | 6/2023 | Karr ...................... | G06F 3/0619 |
| | | | 711/154 |
| 11,733,904 B2 * | 8/2023 | Frank .................... | G06F 3/0683 |
| | | | 711/207 |
| 2016/0314008 A1 | 10/2016 | Han et al. | |
| 2021/0232437 A1 | 7/2021 | Ni et al. | |
| 2023/0038051 A1 | 2/2023 | Chen et al. | |

FOREIGN PATENT DOCUMENTS

| | | |
|---|---|---|
| CN | 109547531 A | 3/2019 |
| CN | 112214444 A | 1/2021 |
| CN | 113515483 A | 10/2021 |
| WO | 2020257976 A1 | 12/2020 |

* cited by examiner

*Primary Examiner* — Pierre Vital
(74) *Attorney, Agent, or Firm* — Conley Rose, P.C.

(57)          ABSTRACT

A computing device includes a central processing unit, at least one heterogeneous device, and a shared memory pool. The central processing unit is configured to: divide the shared memory pool into a plurality of memory spaces, store, in a first memory space in the plurality of memory spaces, first to-be-processed data that is provided by a client and that is associated with a service, and notify a first heterogeneous device of an address of the first to-be-processed data in the first memory space and a first operation that needs to be performed by the first heterogeneous device. The first heterogeneous device performs the first operation on the first to-be-processed data, and stores obtained first data in a second memory space.

15 Claims, 10 Drawing Sheets

DEVICE DATA PROCESSING USING SHARED MEMORY POOL

CROSS-REFERENCE TO RELATED APPLICATIONS

This is a continuation of Int'l Patent App. No. PCT/CN2023/071994, filed on Jan. 13, 2023, which claims priority to Chinese Patent App. No. 202210041883.5, filed on Jan. 14, 2022 and Chinese Patent App. No. 202210801224.7, filed on Jul. 8, 2022, all of which are incorporated by reference.

FIELD

This disclosure relates to the field of data processing technologies, and in particular, to a computing device, a data processing method and system, and a related device.

BACKGROUND

As service complexity is increasingly high, a data amount and a computing scale that are needed for service processing increase gradually. For example, with technical breakthroughs in scenarios such as metaverse, a 3D-oriented development collaboration platform Omniverse, and digital twin, cloud rendering becomes one of mainstream services. The cloud rendering means that storage, computing, and rendering are transferred to the cloud, so that large-scale scenario rendering is performed on the cloud, and a high-quality image is generated in real time. Generally, a cloud rendering service may include processes such as image rendering, artificial intelligence (AI) noise reduction, and encoding and streaming, so that a plurality of types of computing power of devices such as a central processing unit (CPU) and a graphics processing unit (GPU) can be integrated on the cloud to form a pipeline of the computing power, so as to perform different processing processes in the cloud rendering service by using different types of computing power.

During actual application, a plurality of types of processors may be integrated on a computing device for service processing, and each processor has a separately configured memory, so that the computing device can perform service processing by using a plurality of types of computing power provided by the plurality of types of processors. However, resource consumption caused by the service processing by the computing device is high, and a service processing delay is high.

SUMMARY

This disclosure provides a computing device, to reduce resource consumption caused by service processing by the computing device and reduce a service processing delay. In addition, this disclosure provides a data processing method, apparatus, and system, a computer-readable storage medium, and a computer program product.

A first aspect provides a computing device. The computing device includes a central processing unit, at least one heterogeneous device, and a shared memory pool. The at least one heterogeneous device includes a first heterogeneous device. The shared memory pool includes a plurality of shared memories, and the shared memory may be implemented, for example, via a memory module. The central processing unit, the at least one heterogeneous device, and the plurality of shared memories are coupled through a bus.

The central processing unit is configured to: divide the shared memory pool into a plurality of memory spaces, store, in a first memory space in the plurality of memory spaces, first to-be-processed data that is provided by a client and that is associated with a service, and notify the first heterogeneous device of an address of the first to-be-processed data in the first memory space and a first operation that the first heterogeneous device needs to perform on the first to-be-processed data. The first heterogeneous device is configured to: perform the first operation on the first to-be-processed data in the first memory space, and store obtained first data in a second memory space.

In this way, when processing the first to-be-processed data, the heterogeneous device does not need to perform data movement on the first to-be-processed data between different memories, but can directly process the first to-be-processed data in the shared memory pool. In this way, problems of high resource consumption and a high service processing delay that are caused by the movement of the data between the different memories can be avoided, resource consumption needed for service processing is reduced, and a service processing delay is reduced. In addition, the plurality of shared memories in the shared memory pool are coupled to the central processing unit and the heterogeneous device through the bus, so that configuration of the shared memory pool in the computing device may not be affected by the central processing unit and the heterogeneous device (for example, not affected by physical sizes of chips in which the central processing unit and the heterogeneous device are located), and a local memory of the computing device may reach a high level. For example, a memory pool with a capacity of a terabyte level may be configured in the computing device. In this way, the computing device may load a large amount of data to the local memory for processing, and a requirement for real-time processing of the large amount of data in an actual scenario is met.

The second memory space may be notified by the central processing unit to the heterogeneous device, or may be determined by the heterogeneous device. This is not limited.

In a possible implementation, the central processing unit is further configured to notify the first heterogeneous device that a storage location of the data generated through the first operation that needs to be performed on the to-be-processed data is the second memory space in the plurality of memory spaces. In this way, the central processing unit allocates and manages all the memory spaces.

In a possible implementation, the at least one heterogeneous device in the computing device further includes a second heterogeneous device. The central processing unit is further configured to: store, in a third memory space in the plurality of memory spaces, second to-be-processed data that is provided by the client and that is associated with the service, and notify the second heterogeneous device of an address of the second to-be-processed data in the third memory space and a second operation that the second heterogeneous device needs to perform on the second to-be-processed data, and that a storage location of data generated through the second operation is a fourth memory space in the plurality of memory spaces. The second heterogeneous device is configured to: perform the second operation on the second to-be-processed data in the third memory space to obtain the second data, and store the second data in the fourth memory space. In this way, the computing device may concurrently process, by using a plurality of heterogeneous devices, to-be-processed data associated with the service, thereby improving data processing efficiency and shortening time consumption corresponding to the service.

In a possible implementation, the at least one heterogeneous device in the computing device further includes a second heterogeneous device. The central processing unit is further configured to notify the second heterogeneous device of an address of the first data in the second memory space and a second operation to be performed by the second heterogeneous device on the first data, and that a storage location of data generated through the second operation is a fourth memory space in the plurality of memory spaces. The second heterogeneous device is configured to: perform the second operation on the first data in the second memory space, and store the obtained second data in the fourth memory space. In this way, the computing device may sequentially process services by using the plurality of heterogeneous devices. In addition, each heterogeneous device may directly process data in the shared memory pool without moving the data between different memories, thereby improving data processing efficiency.

In a possible implementation, the first heterogeneous device and the second heterogeneous device are graphics processing units GPUs.

In a possible implementation, the at least one heterogeneous device in the computing device further includes a third heterogeneous device. The central processing unit is further configured to: provide an address of the second memory space and an address of the fourth memory space for the third heterogeneous device, and notify the third heterogeneous device of a third operation to be performed on the first data and the second data, and that a storage location of data generated through the third operation is a fifth memory space in the plurality of memory spaces. The third heterogeneous device is configured to: perform the third operation on the first data in the second memory space and the second data in the fourth memory space to obtain the third data, and store the third data in the fifth memory space. In this way, the computing device may continue to process data by using more heterogeneous devices, and the processed data may not need to be moved between different memories, thereby improving data processing efficiency.

In a possible implementation, the third heterogeneous device is a graphics processing unit GPU, a neural processing unit (NPU), or a video processing unit (VPU).

In a possible implementation, the at least one heterogeneous device in the computing device further includes a third heterogeneous device, and the third heterogeneous device is connected to another computing device through a network. The central processing unit is further configured to: provide an address of the second memory space and an address of the fourth memory space for the third heterogeneous device, notify the third heterogeneous device of a third operation to be performed on the first data and the second data, and send data generated through the third operation to the another computing device. The third heterogeneous device is configured to: perform the third operation on the first data in the second memory space and the second data in the fourth memory space to obtain the third data, and send the third data to the another computing device. In this way, the third heterogeneous device may output processed service data (namely, the third data) to the another computing device, to meet a service requirement, or send the service data to the another computing device for further processing.

In a possible implementation, the third heterogeneous device is a network adapter, and is configured to: forward the third data to the another computing device.

In a possible implementation, the service is an image rendering task, and the first to-be-processed data associated with the service is image data. Therefore, the computing device may process the image rendering task via a plurality of heterogeneous devices, and improve processing efficiency of the service data via the shared memory pool.

In a possible implementation, the bus used to couple the shared memory, the central processing unit, and the at least one heterogeneous device is a generation Z bus, or a cache coherent interconnect for accelerators CCIX bus, or a compute express link CXL bus.

In a possible implementation, a capacity of the shared memory pool is not less than 1 terabyte TB.

A second aspect further provides a data processing method. The data processing method is applied to a computing device. The computing device includes a central processing unit, at least one heterogeneous device, and a shared memory pool. The at least one heterogeneous device includes a first heterogeneous device. The shared memory pool includes a plurality of shared memories. The central processing unit, the at least one heterogeneous device, and the plurality of shared memories are coupled through a bus. The method includes: The central processing unit divides the shared memory pool into a plurality of memory spaces. The central processing unit stores, in a first memory space in the plurality of memory spaces, first to-be-processed data that is provided by a client and that is associated with a service. The central processing unit notifies the first heterogeneous device of an address of the first to-be-processed data in the first memory space and a first operation to be performed by the first heterogeneous device on the first to-be-processed data. The first heterogeneous device performs the first operation on the first to-be-processed data in the first memory space to obtain first data, and stores the first data in a second memory space.

In a possible implementation, the at least one heterogeneous device in the computing device further includes a second heterogeneous device. The method further includes: The central processing unit stores, in a third memory space in the plurality of memory spaces, second to-be-processed data that is provided by the client and that is associated with the service. The central processing unit notifies the second heterogeneous device of an address of the second to-be-processed data in the third memory space and a second operation to be performed by the second heterogeneous device on the second to-be-processed data, and that a storage location of data generated through the second operation is a fourth memory space in the plurality of memory spaces. The second heterogeneous device performs the second operation on the second to-be-processed data in the third memory space to obtain the second data, and stores the second data in the fourth memory space.

In a possible implementation, the at least one heterogeneous device in the computing device further includes a second heterogeneous device. The method further includes: The central processing unit notifies the second heterogeneous device of an address of the first data in the second memory space and a second operation to be performed by the second heterogeneous device on the first data, and that a storage location of data generated through the second operation is a fourth memory space in the plurality of memory spaces. The second heterogeneous device performs the second operation on the first data in the second memory space to obtain the second data, and stores the second data in the fourth memory space.

In a possible implementation, the first heterogeneous device and the second heterogeneous device are graphics processing units GPUs.

In a possible implementation, the at least one heterogeneous device in the computing device further includes a third heterogeneous device. The method further includes: The central processing unit provides an address of the second memory space and an address of the fourth memory space for the third heterogeneous device. The central processing unit notifies the third heterogeneous device of a third operation to be performed on the first data and the second data and that a storage location of data generated through the third operation is a fifth memory space in the plurality of memory spaces. The third heterogeneous device performs the third operation on the first data in the second memory space and the second data in the fourth memory space to obtain the third data, and stores the third data in the fifth memory space.

In a possible implementation, the third heterogeneous device is a graphics processing unit GPU, an NPU, or a VPU.

In a possible implementation, the at least one heterogeneous device in the computing device further includes a third heterogeneous device. The third heterogeneous device is connected to another computing device through a network. The method further includes: The central processing unit provides an address of the second memory space and an address of the fourth memory space for the third heterogeneous device. The central processing unit notifies the third heterogeneous device of a third operation to be performed on the first data and the second data, and sends data generated through the third operation to the another computing device. The third heterogeneous device performs the third operation on the first data in the second memory space and the second data in the fourth memory space to obtain the third data, and sends the third data to the another computing device.

In a possible implementation, the third heterogeneous device is a network adapter.

In a possible implementation, the method further includes: The central processing unit notifies the first heterogeneous device that a storage location of the data generated through the first operation is the second memory space in the plurality of memory spaces.

In a possible implementation, the service is an image rendering task, and the first to-be-processed data is image data.

In a possible implementation, the bus used to couple the shared memory, the central processing unit, and the at least one heterogeneous device is a generation Z bus, a CCIX bus, or a CXL bus.

In a possible implementation, a capacity of the shared memory pool is not less than 1 TB.

The data processing method provided in the second aspect corresponds to the computing device provided in the first aspect. Therefore, for technical effects of the data processing method in the second aspect and any possible implementation of the second aspect, refer to the technical effects of the first aspect and the corresponding implementations of the first aspect. Details are not described herein again.

A third aspect provides a data processing system. The data processing system includes at least one computing device. The computing device is the computing device according to the first aspect or any implementation of the first aspect.

A fourth aspect provides a computer-readable storage medium. The computer-readable storage medium stores instructions. When the instructions are run on a computing device, the computing device is enabled to perform the method according to the second aspect or any implementation of the second aspect.

A fifth aspect provides a computer program product including instructions. When the computer program product runs on a computing device, the computing device is enabled to perform the method according to the second aspect or any implementation of the second aspect.

The implementations provided in the foregoing aspects may be combined to provide more implementations.

BRIEF DESCRIPTION OF THE DRAWINGS

To describe the technical solutions in embodiments more clearly, the following briefly describes the accompanying drawings needed for describing embodiments. It is clear that the accompanying drawings in the following description show merely some embodiments, and an ordinary person skilled in the art may still derive other drawings from these accompanying drawings.

DETAILED DESCRIPTION

In the implementation, claims, and accompanying drawings, the terms "first", "second", and the like are intended to distinguish between similar objects but do not necessarily indicate an order or sequence. It should be understood that the terms used in such a way are interchangeable in a proper circumstance, and this is merely a distinguishing manner used for describing objects with a same attribute in embodiments.

Figure 1:
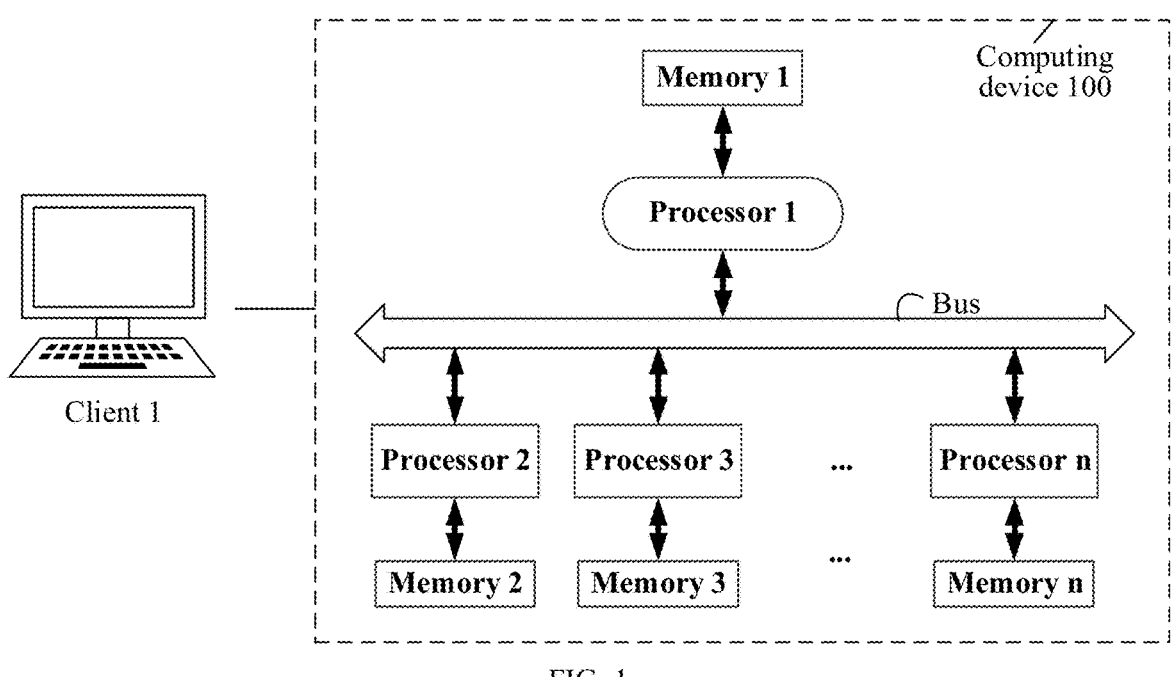
FIG. 1 is a diagram of a structure of a computing device.

FIG. 1 is a diagram of a structure of a computing device. As shown in FIG. 1, a computing device 100 includes a plurality of processors. In FIG. 1, an example in which n processors (a processor 1 to a processor n) are included is used for description. Each processor may be independently configured with a memory. For example, a processor 1 is configured with a memory 1, and a processor 2 is configured with a memory 2. In addition, the processor 1 and the processor 2 may be coupled through a bus. At least two processors in the n processors belong to different types, and may provide different types of computing power for the computing device 100. For example, the processor 1 and the processor 2 are processors of different types, the processor 1 is a CPU, and the processor 2 is a GPU.

In an actual scenario, the computing device 100 may process a service, for example, a cloud rendering service requested by a client 1, by using different types of computing power. In this case, the processor 1 first writes to-be-processed data corresponding to the service into the memory 1, processes the to-be-processed data in the memory 1, and stores intermediate data obtained through the processing in the memory 1. Then, the processor 2 reads the intermediate data stored in the memory 1 to the memory 2 through the bus, processes the intermediate data in the memory 2, and stores final data obtained through the processing in the memory 2. In a process of processing service data, same data (namely, the foregoing intermediate data) needs to be moved between different memories. This not only causes high resource consumption, but also affects efficiency of processing the service data by the computing device 100. Particularly, when the computing device sequentially processes the service data by using three or more processors, the service data may be frequently moved between a plurality of different memories. This severely affects performance of processing the service by the computing device 100.

In addition, in an actual scenario, due to a limitation of a hardware environment, a memory capacity separately configured for each processor is usually limited. Because of a chip in which a processor is located is usually limited, a physical size of a memory deployed on the chip is also limited. As a result, a memory capacity that can be configured for the processor on the chip is usually small, for example, not exceeding 32 gigabytes (GB). In this way, it is difficult for the computing device 100 to simultaneously load a large amount of to-be-processed data to a local memory for processing, and usually, processing of all service data can be implemented only by sequentially processing different parts of the service data. Consequently, it is difficult to implement a requirement for performing real-time processing on the large amount of data.

Figure 2:
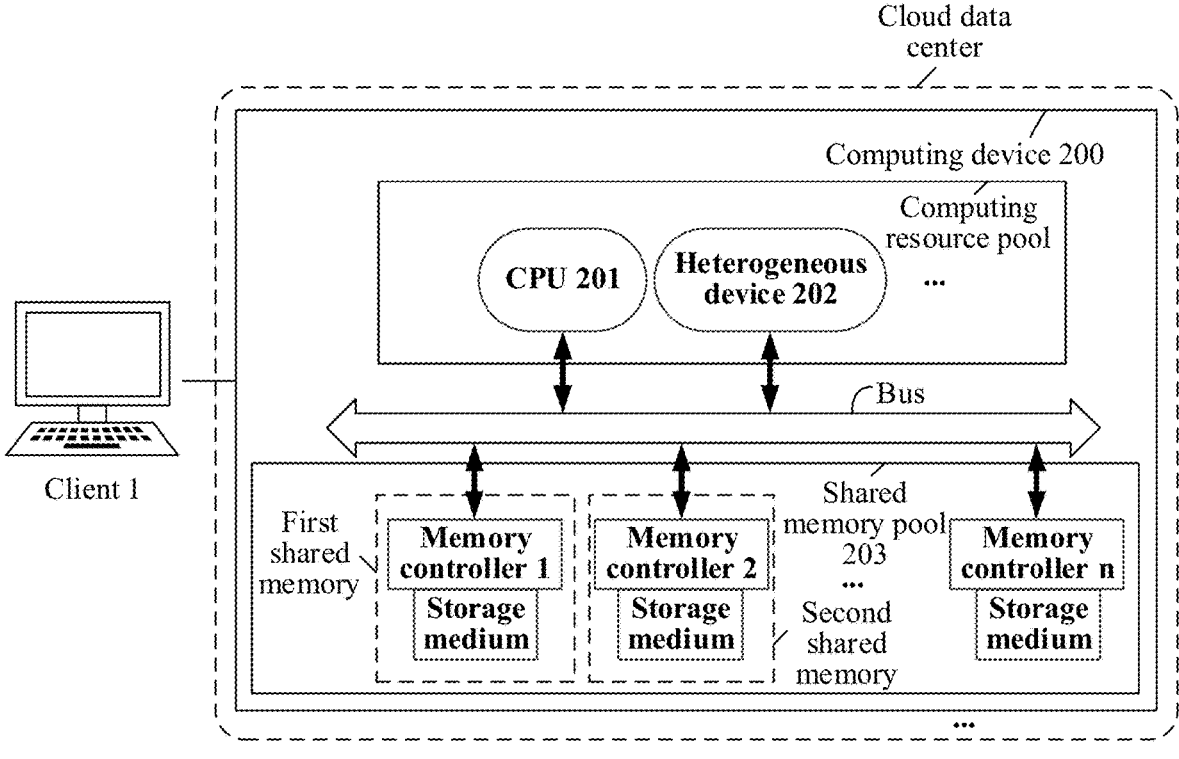
FIG. 2 is a diagram of a structure of a computing device according to an embodiment.

On this basis, embodiments provide a computing device, to improve performance of processing a service by the computing device, and further meet the requirement for performing real-time processing on a large amount of data. As shown in FIG. 2, a computing device 200 includes a CPU 201, a heterogeneous device 202 (the CPU 201 and the heterogeneous device 202 may form a computing resource pool), and a shared memory pool 203. In FIG. 2, an example in which the CPU 201 and the heterogeneous device 202 are included is used for description.

The CPU 201 and the heterogeneous device 202 can provide different types of computing power for the computing device 200. For example, the heterogeneous device 202 may be a GPU, or the heterogeneous device 202 may be an NPU. This is not limited in embodiments. In addition, the CPU 201 and the heterogeneous device 202 in the computing device 200 may be located on different base boards/chips.

The shared memory pool 203 includes a plurality of shared memories, including a first shared memory, a second shared memory, and the like in FIG. 2. Each shared memory may be implemented by using a memory controller and a storage medium. In FIG. 2, an example in which the shared memory pool 203 is implemented by using n shared memories is used. The shared memory includes the memory controller and the corresponding storage medium, and the shared memory may be, for example, a memory module. In addition, during actual deployment, a capacity of the shared memory pool 203 may be expanded through scale-out, a capacity of the shared memory pool 203 may be expanded as a quantity of memory controllers and a quantity of storage media increase. The memory controller is a bus circuit controller that controls the shared memory pool 203 inside the computing device 200 and that is configured to manage and plan data transmission from the shared memory pool 203 to the CPU 201 or the heterogeneous device 202. The shared memory pool 203 may exchange data with the CPU 201 or the heterogeneous device 202 via the memory controller. The memory controller may be an independent chip, and may control necessary logic to write data into the shared memory pool 203 or read data from the shared memory pool 203. The memory controller may be implemented by using a general-purpose processor, a dedicated accelerator, a GPU, a field-programmable gate array (FPGA), an embedded processor, or the like. The storage medium in the shared memory pool 203 may be implemented by using a dynamic random-access memory (DRAM), or may be a dual in-line memory module (DIMM), or the like. One DIMM may be usually used as a memory module entity, and each memory module entity may have two surfaces, and the two surfaces each have a memory particle. Each surface may be referred to as a rank, one memory module entity may have two ranks, and each rank may include a plurality of memory chips. For example, the memory controller may be connected to the storage medium through a double data rate (DDR) bus, or may be connected to the storage medium through another bus. During actual application, the shared memory pool 203 may alternatively be implemented in another manner. For example, the storage medium in the shared memory pool 203 may alternatively be a storage medium of another type. This is not limited in embodiments.

The CPU 201, the heterogeneous device 202, and the shared memory pool 203 in the computing device 200 may be coupled through a bus. For example, the CPU 201 may access data in the shared memory pool 203 through the bus, or send data (such as operation instructions) to the heterogeneous device 202 through the bus. The bus may be a Peripheral Component Interconnect Express (PCIe) bus, or may be a bus of another type, for example, a cache coherent interconnect for accelerators (CCIX) bus, a generation Z (Gen-Z) bus, or a compute express link (CXL) bus. This is not limited in embodiments.

The heterogeneous device 202 may be, for example, a heterogeneous processor of any type such as a GPU, an NPU, or a VPU, or may be another device.

For example, the computing device 200 may be deployed in a cloud data center. In FIG. 2, an example in which the cloud data center includes one computing device 200 is used. During actual application, the cloud data center may alternatively include a plurality of computing devices. In addition, both the cloud data center and a client 1 access the Internet, so that the client 1 implements network communication with each computing device in the cloud data center through the Internet.

The CPU 201 may divide the shared memory pool 203 into a plurality of memory spaces. In this way, when the computing device 200 processes a service by using computing power provided by the heterogeneous device, the CPU 201 may receive to-be-processed data that is provided by the client 1 and that is associated with a service, and write the to-be-processed data into a first memory space that is allocated to the service and that is in the shared memory pool 203. As shown in FIG. 2, the CPU 201 may notify the heterogeneous device 202 of an address of the to-be-processed data in the first memory space and a first operation that needs to be performed by the heterogeneous device 202 on the to-be-processed data.

Then, the heterogeneous device 202 may perform the first operation on the to-be-processed data in the first memory space, to obtain first data. In this case, the heterogeneous device 202 may directly access the first data in the first memory space, perform the corresponding first operation on the to-be-processed data in the shared memory pool to obtain the first data, and store the first data in a second memory space that is in the shared memory pool 203, as shown in FIG. 2. In this case, if the first data is data finally output by the computing device 200 when the computing device 200 processes the service, the computing device 200 may send the first data to the client 1. If the computing device 200 further needs to process the first data, another heterogeneous device in the computing device 200 may continue to process the first data in the shared memory pool 203, and send data finally obtained by processing the first data to the client 1.

In this way, when processing the to-be-processed data, the heterogeneous device 202 does not need to perform data movement on the to-be-processed data between different memories, but can directly process the to-be-processed data in the shared memory pool 203. This can avoid problems of high resource consumption and a high service processing delay caused by data movement between different memories, reduce resource consumption needed for service processing, and reduce a service processing delay.

In addition, a plurality of shared memories in the shared memory pool 203 are interconnected with the CPU 201 and the heterogeneous device 202 through the bus, so that the shared memory pool 203 configured in the computing device 200 may be not affected by the CPU 201 and the heterogeneous device 202 (which is, for example, not affected by physical sizes of chips in which the CPU 201 and the heterogeneous device 202 are located), so that a local memory of the computing device 200 can reach a high level, where for example, a memory pool with a capacity in units of terabyte (TB) may be configured in the computing device 200. In this way, the computing device 200 may simultaneously load a large amount of data into the local memory (namely, the shared memory pool 203) for processing, to meet a requirement for performing real-time processing on a large amount of data in an actual scenario.

It should be noted that the computing device 200 shown in FIG. 2 is merely used as an example for description, and is not used to limit an implementation of the computing device 200. For example, in another embodiment, in addition to including the shared memory pool 203, the computing device 200 may further configure a separate memory (which is independent of the shared memory pool 203) for the CPU 201 and the heterogeneous device 202, so that the CPU 201 and the heterogeneous device 202 may process another service by using the separately configured memory. Alternatively, the computing device 200 may include heterogeneous devices with a larger quantity or more types, and there may be one or more heterogeneous devices of each type. Alternatively, the computing device 200 may further include more components with another function, and the like. This is not limited in embodiments.

During actual deployment, the computing device 200 may be deployed on a user side, in other words, may be used as a local device to provide a local data processing service for a user; or the computing device 200 may be deployed on a cloud, for example, a public cloud, an edge cloud, or a distributed cloud, and is configured to: provide a cloud data processing service, for example, a cloud rendering service, for a user.

For ease of understanding, the following describes in detail a process of processing service data by the computing device 200 based on the computing device 200 shown in FIG. 2.

In this embodiment, the client 1 (or another client) may request the computing device 200 to process a service, and the service may be, for example, an image rendering service or another cloud service. In an implementation, the client 1 may generate a service processing request, where the service processing request may include an identifier of a service and to-be-processed data associated with the service, and send the service processing request to the computing device 200. The client 1 may be, for example, a network browser provided by the computing device 200 externally, and is configured to interact with a user. Alternatively, the client 1 may be an application run on a user terminal, for example, a software development kit (SDK).

The CPU 201 may receive the service processing request sent by the client 1, parse out, from the service processing request, the identifier of the service and the to-be-processed data (which is, for example, image data in the image rendering service) associated with the service, and determine, based on the identifier of the service, the heterogeneous device 202 that processes the service and that is in the computing device 200. One or more heterogeneous devices used by the computing device 200 to process different services may be preconfigured based on an actual requirement. For example, the computing device 200 may process a service by using the heterogeneous device 202, and process, by using a heterogeneous device in the computing device 200 other than the heterogeneous device 202, the service requested by the client 1. For ease of description, in this embodiment, an example in which the computing device 200 processes the service based on the heterogeneous device 202 is used for description.

The CPU 201 may allocate the first memory space in the shared memory pool 203 to the service based on a data amount of the to-be-processed data that is associated with the service and that is carried in the service processing request. The CPU 201 may divide the shared memory pool 203 into a plurality of memory spaces, so that the CPU 201 may allocate a first memory space in the plurality of memory spaces to a service. A size of the first memory space may be determined based on the amount of the to-be-processed data, or the size of the first memory space may be pre-configured by a skilled person for the service, so that the CPU 201 may determine, based on the identifier of the service by querying configuration information, the size of the first memory space that is in the shared memory pool 203 and that is allocated to the service.

Then, the CPU 201 writes the to-be-processed data associated with the service into the first memory space, and records an address at which the to-be-processed data is stored in the first memory space. For example, the address may be represented by, for example, a start address at which the to-be-processed data is stored in the first memory space and a length of the to-be-processed data.

Then, the CPU 201 may notify the heterogeneous device 202 of the address of the to-be-processed data in the first memory space and the first operation to be performed by the heterogeneous device 202 on the to-be-processed data. In an implementation example, the CPU 201 may generate an operation instruction for the to-be-processed data, and send the operation instruction to the heterogeneous device 202. The operation instruction may include the address at which the to-be-processed data is stored in the first memory space. For example, the operation instruction may include a pointer and a data length. The pointer indicates the start address at which the to-be-processed data is stored in the first memory space, and the data length indicates the length of the to-be-processed data. In addition, the operation instruction may further carry an instruction that indicates the first operation that needs to be performed by the heterogeneous device 202 on the to-be-processed data. A type of the first operation is related to computing power of the heterogeneous device 202. For example, when the heterogeneous device 202 is a GPU, the first operation may be, for example, a rendering operation on the to-be-processed data; or when the heterogeneous device 202 is an NPU, the first operation may be, for example, an AI noise reduction operation on the to-be-processed data.

In this embodiment, a message queue may be configured in the heterogeneous device 202, and the heterogeneous device 202 may cache, via the message queue, the operation instruction sent by the CPU 201. The heterogeneous device 202 may read the operation instruction from the message queue, and parse out a location that is of the to-be-processed data in the first memory space and that is in the operation instruction, so that the heterogeneous device 202 locates the to-be-processed data in the first memory space. Therefore, the heterogeneous device 202 may perform the first operation on the to-be-processed data based on the operation instruction, and store the first data, obtained through processing, in the second memory space that is in the shared memory pool 203. In this way, processing of the to-be-processed data in the shared memory pool 203 is implemented. The second memory space may be specified by the CPU 201. For example, the operation instruction sent by the CPU 201 to the heterogeneous device 202 may further include an address of the second memory space. The address may be represented by using a start address of the second memory space and a size of the second memory space. Alternatively, the second memory space may be determined by the heterogeneous device 202, the heterogeneous device 202 may determine the second memory space from remaining available memory space that is in the shared memory pool 203.

During actual application, when the computing device 200 processes the to-be-processed data by using only the computing power provided by the heterogeneous device 202, the computing device 200 may feed back, to the client 1, the first data as data finally obtained through processing. When the computing device 200 further continues to process the first data by using computing power provided by another heterogeneous device, the computing device 200 may feed back, to the client 1, data finally obtained by processing the first data by the another heterogeneous device. This is not limited in embodiments.

It may be understood that, because the heterogeneous device 202 can directly process the to-be-processed data in the shared memory pool 203, data movement does not need to be performed on the to-be-processed data does between different memories. In this way, resource consumption needed for processing the service by the computing device 200 can be reduced, and a service processing delay can be reduced. In addition, the computing device 200 may support simultaneous writing of a large amount of to-be-processed data into the shared memory pool 203, so that the CPU 201 and the heterogeneous device 202 in the computing device 200 can process a large amount of service data each time, thereby improving service processing efficiency.

It should be noted that in embodiments shown in FIG. 2, an example in which the computing device 200 processes, based on one heterogeneous device 202, the to-be-processed data associated with the service is used for description. In another embodiment, the computing device 200 further includes another heterogeneous device. In addition, when the service requires processing based on a plurality of heterogeneous devices, the computing device 200 may process data of the service by using the heterogeneous device 202 and the another heterogeneous device.

Figures 3, 4:
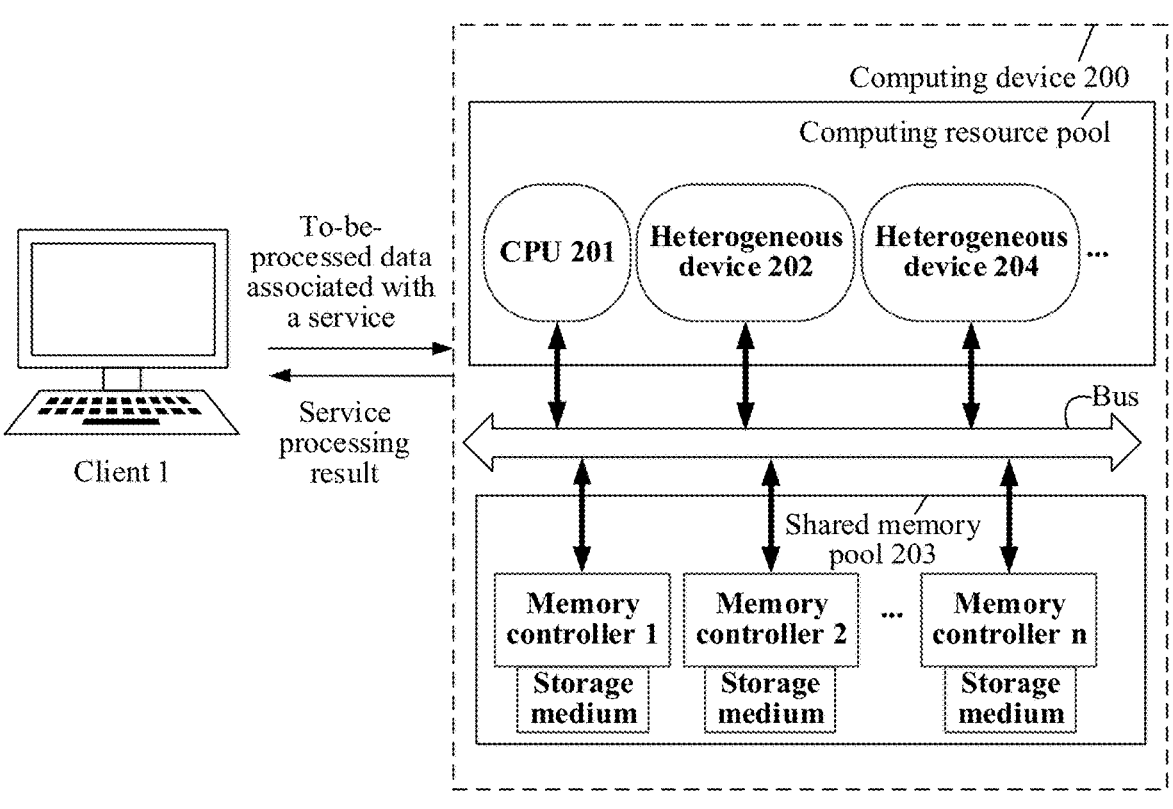
FIG. 3 is a diagram of a structure of another computing device according to an embodiment.
FIG. 4 is a diagram of a structure of still another computing device according to an embodiment.

For example, refer to the computing device 200 shown in FIG. 3. Based on the computing device 200 shown in FIG. 2, the computing device 200 shown in FIG. 3 further includes a heterogeneous device 204. Different from the embodiment shown in FIG. 2, in the computing device 200 shown in FIG. 3, the heterogeneous device 204 may collaborate with the heterogeneous device 202 to process the to-be-processed data associated with the service. For ease of understanding, this embodiment provides the following two implementation examples for description.

In a first implementation example, the heterogeneous device 202 and the heterogeneous device 204 may concurrently process the to-be-processed data associated with the service requested by the client 1. For example, both the heterogeneous device 202 and the heterogeneous device 204 are GPUs, and the computing device 200 may concurrently process, by using a plurality of GPUs, different service data generated by the image rendering service.

In an implementation, the CPU 201 may receive the first to-be-processed data and second to-be-processed data that are sent by the client 1 for the service. In addition, the CPU 201 may write the first to-be-processed data into the first memory space that is in the shared memory pool 203, and record an address of the first to-be-processed data in the first memory space; and write the second to-be-processed data into a third memory space that is in the shared memory pool 203, and record an address of the second to-be-processed data in the third memory space. Then, the CPU 201 may generate an operation instruction 1, where the operation instruction 1 may carry the address at which the first to-be-processed data is stored in the first memory space, the first operation that needs to be performed by the heterogeneous device 202 on the first to-be-processed data, and a storage location of the data generated through the first operation is the second memory space in the shared memory pool 203. In addition, the CPU 201 may further generate an operation instruction 2, where the operation instruction 2 may carry an address at which the second to-be-processed data is stored in the second memory space, a second operation that needs to be performed by the heterogeneous device 202 on the second to-be-processed data, and a storage location of data generated through the second operation is a fourth memory space in the shared memory pool 203. Then, the CPU 201 may send the operation instruction 1 to the message queue in the heterogeneous device 202 through the interconnection bus, and send the operation instruction 2 to a message queue in the heterogeneous device 204 through the interconnection bus.

The heterogeneous device 202 reads the operation instruction 1 from the message queue, and determines the first to-be-processed data in the first memory space based on the operation instruction 1, to perform the first operation on the first to-be-processed data to obtain the corresponding first data, store the first data in the second memory space indicated by the CPU 201, and obtain an address at which the first data is stored in the second memory space.

In addition, the heterogeneous device 204 reads the operation instruction 2 from the message queue, and determines the second to-be-processed data in the third memory space based on the operation instruction 2, to perform the second operation on the second to-be-processed data to obtain the corresponding second data, store the second data in the fourth memory space indicated by the CPU 201, and obtain an address at which the second data is stored in the fourth memory space.

In this way, the computing device 200 concurrently processes the first to-be-processed data and the second to-be-processed data of the service based on the plurality of heterogeneous devices, so that data processing efficiency of the computing device 200 can be improved.

In a second implementation example, the heterogeneous device 202 and the heterogeneous device 204 may serially process the to-be-processed data associated with the service requested by the client 1. For example, the heterogeneous device 202 is a GPU, and the heterogeneous device 204 is a video processor (or an NPU). In addition, the GPU and the video processor (or the NPU) may serially process service data generated by the image rendering service. Alternatively, both the heterogeneous device 202 and the heterogeneous device 204 are GPUs, and are configured to sequentially process service data generated by the image rendering service.

In an implementation, the CPU 201 may receive the first to-be-processed data that is sent by the client 1 for the service, write the first to-be-processed data into the first memory space that is in the shared memory pool 203, and record an address of the first to-be-processed data in the first memory space. Then, the CPU 201 may generate an operation instruction 1, and send, through the interconnection bus, the operation instruction 1 to a message queue that is in the heterogeneous device 202. The operation instruction 1 may carry the address at which the first to-be-processed data is stored in the first memory space, the first operation that needs to be performed by the heterogeneous device 202 on the first to-be-processed data, and a storage location of the data generated through the first operation is the second memory space in the shared memory pool 203.

The heterogeneous device 202 reads the operation instruction 1 from the message queue, and determines the first to-be-processed data in the first memory space based on the operation instruction 1, to perform the first operation on the first to-be-processed data to obtain the corresponding first data, store the first data in the second memory space indicated by the CPU 201, and obtain an address at which the first data is stored in the second memory space. Then, the heterogeneous device 202 may feed back the address of the first data in the second memory space to the CPU 201.

Then, the CPU 201 may generate an operation instruction 2, and send, through the interconnection bus, the operation instruction 2 to a message queue that is in the heterogeneous device 204. The operation instruction 2 may carry the address at which the first data is stored in the second memory space, a second operation that needs to be performed by the heterogeneous device 204 on the first data, and a storage location of data generated through the second operation is a fourth memory space in the shared memory pool 203.

The heterogeneous device 204 reads the operation instruction 2 from the message queue, and determines the first data in the second memory space based on the operation instruction 2, to perform the second operation on the first data to obtain the corresponding second data, and stores the second data in the fourth memory space indicated by the CPU 201.

The foregoing implementation examples are merely used as some examples for description, and are not used to limit a an implementation in which the plurality of heterogeneous devices in the computing device 200 process service data.

For example, in another implementation example, after determining that execution of the first operation is completed, the heterogeneous device 202 may generate an operation instruction 2, and send the operation instruction 2 to a message queue that is in the heterogeneous device 204, to control the heterogeneous device 204 to perform a second operation on the first data in the second memory space, and store generated second data in the fourth memory space.

Further, when the computing device 200 processes the service data by using only the computing power provided by the heterogeneous device 202 and computing power provided by the heterogeneous device 204, the computing device 200 may use the second data as a final processing result and feed back the second data to the client 1.

In the foregoing embodiments shown in FIG. 2 and FIG. 3, an example in which the computing device 200 processes a service based on the CPU 201 and one or more heterogeneous devices is mainly used for description. In an actual scenario, the computing device 200 may support processing of a plurality of different services requested by a client, and the computing device 200 may use different computing power combinations when processing different services. The different computing power combinations include different computing power types or different computing power specifications. For example, as shown in FIG. 4, when the client 1 requests the computing device 200 to process a service, the computing device 200 may alternatively be required to perform processing by using the CPU 201, the heterogeneous device 202, the heterogeneous device 204, and a heterogeneous device 205.

FIG. 4 is a diagram of still another computing device 200. Based on the computing device 200 shown in FIG. 3, the computing device 200 shown in FIG. 4 may further include a heterogeneous device 205. A type of the heterogeneous device 205 may be different from a type of the heterogeneous device 202 and a type of the heterogeneous device 204. For example, the heterogeneous device 202 is a GPU, the heterogeneous device 204 is an NPU, and the heterogeneous device 205 is a VPU. Alternatively, the heterogeneous device 205 is a network adapter having a data forwarding function, and is configured to forward data to another computing device. Alternatively, the type of the heterogeneous device 205 may be the same as the type of the heterogeneous device 202, where for example, the two heterogeneous devices are both GPUs; or the type of the heterogeneous device 205 may be the same as the type of the heterogeneous device 204, where for example, the two heterogeneous devices are both NPUs.

Different from the embodiment shown in FIG. 3, in this embodiment, the CPU 201 may generate an operation instruction 3, where the operation instruction 3 includes the address of the first data in the second memory space, the address of the second data in the fourth memory space, a third operation that needs to be performed by the heterogeneous device 205 on the first data and the second data, a storage location of data generated through the third operation is a fifth memory space in the shared memory pool 203. Then, the CPU 201 may send the operation instruction 3 to a message queue that is in the heterogeneous device 205. The second data may be data generated by the heterogeneous device 204 by performing the second operation on the second to-be-processed data, or may be data generated by the heterogeneous device 204 by performing the second operation on the first data. This is not limited in embodiments.

The heterogeneous device 204 reads the operation instruction 3 from the message queue, obtains the first data from the second memory space based on the operation instruction 3, and obtains the second data from the fourth memory space, so that the heterogeneous device 204 may perform the third operation on the first data and the second data to obtain the corresponding third data and store the third data in the fifth memory space indicated by the CPU 201.

Further, when the computing device 200 processes the service data by using only the computing power provided by the heterogeneous device 202, the computing power provided by the heterogeneous device 204, and computing power provided by the heterogeneous device 205, the computing device 200 may use the third data as a final processing result and feed back the third data to the client 1.

Alternatively, the heterogeneous device 205 may be a device having a data forwarding capability, for example, a network adapter. In this case, the heterogeneous device 205 may send, based on an indication of the CPU 201, the third data to another computing device that is connected to the heterogeneous device through a network.

The CPU 201 may generate the operation instruction 3, and in addition to including the address of the first data in the second memory space, the address of the second data in the fourth memory space, and the third operation that needs to be performed by the heterogeneous device 205 on the first data and the second data, the operation instruction 3 further includes indication information for notifying the heterogeneous device 205 to send the data generated through the third operation to the another computing device. In this way, after performing the third operation on the first data and the second data and obtaining the corresponding third data, the heterogeneous device 204 directly sends the third data to the another computing device, and the third data does not need to be stored in the shared memory pool 203.

In this embodiment, the computing device 200 may flexibly select different computing power combinations from a computing resource pool based on a service requirement to process different services. In a further implementation, the computing device 200 may further flexibly select shared memories of different capacities from the shared memory pool 203 based on the service requirement, to support a plurality of heterogeneous devices of a same computing power type or different computing power types in processing service data in the shared memory pool. For example, when the computing device 200 processes a service 1, a capacity of a total memory space allocated from the shared memory pool 203 to the service 1 is 1 TB. When the computing device 200 processes a service 2, a capacity of a total memory space allocated from the shared memory pool 203 to the service is 10 TB.

In embodiments shown in FIG. 2 to FIG. 4, each heterogeneous device in the computing device 200 processes the service by using a memory space that is in the shared memory pool 203. In another implementation example, one or more heterogeneous devices in the computing device 200 may further have a separately configured local memory, and the heterogeneous device may use the separately configured local memory to process corresponding service data, to meet a requirement of the computing device 200 on a high memory access bandwidth of a part of services.

Figure 5:
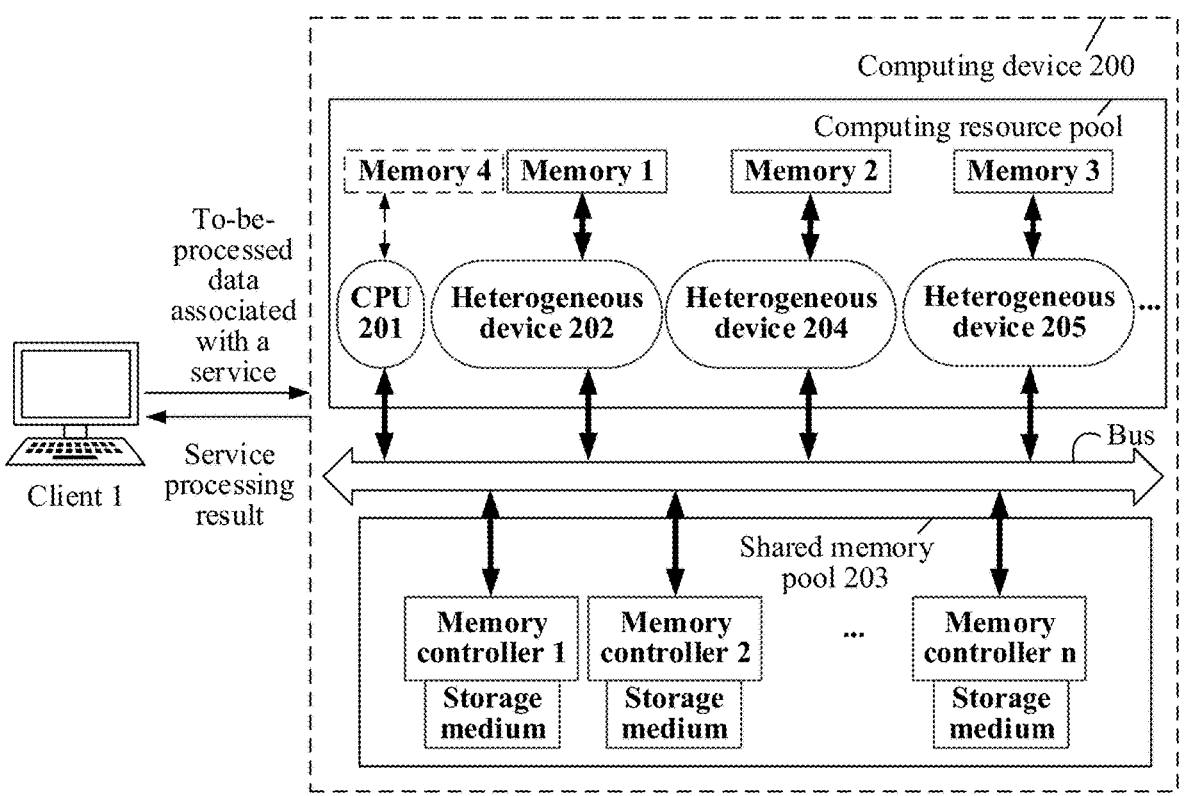
FIG. 5 is a diagram of a structure of yet another computing device according to an embodiment.

Refer to the computing device 200 shown in FIG. 5. Based on the computing device 200 shown in FIG. 4, in the computing device 200 shown in FIG. 5, the heterogeneous device 202, the heterogeneous device 204, and the heterogeneous device 205 are separately configured with a corresponding local memory, for example, a memory 1, a memory 2, and a memory 3 that are shown in FIG. 5. The memory 1 may be deployed on a chip/base board on which the heterogeneous device 202 is located. The memory 2 may be deployed on a chip/base board on which the heterogeneous device 204 is located. The memory 3 may be deployed on a chip/base board on which the heterogeneous device 205 is located. Generally, a speed at which the heterogeneous device 202 accesses the memory 1 on the chip or the base board is usually higher than a speed at which the heterogeneous device 202 accesses a shared memory in the shared memory pool 203 through a PCIe bus, which is similar when another heterogeneous device accesses a respective local memory.

In this way, when processing a part of services that have a high requirement for a memory access speed, the heterogeneous device 202 in the computing device 200 may access the memory 1 based on a large bandwidth, and process service data by using the memory 1. For example, a capacity of a memory separately configured for a heterogeneous device in the computing device 200 may be at a GB level. For example, a capacity of a memory separately configured for each heterogeneous device is 32 GB. This is not limited in embodiments. Further, for the memory separately configured for each heterogeneous device, data may be cached at a coarse granularity of a 4 kilobyte (kB) page table, so that impact caused by a high-speed interconnection bus between heterogeneous devices can be reduced.

In a further possible implementation, the CPU 201 in the computing device 200 may alternatively have a separately configured memory, for example, a memory 4 in FIG. 5, so that the CPU 201 performs a corresponding data processing process based on the memory 4.

In embodiments shown in FIG. 2 to FIG. 5, an example in which a computing resource pool and a memory pool are constructed inside the computing device 200 is used for description. In another embodiment, the computing device 200 may be further interconnected with another computing device through a high-speed interconnection interface, to construct a memory pool with a larger capacity across computing devices.

Figure 6:
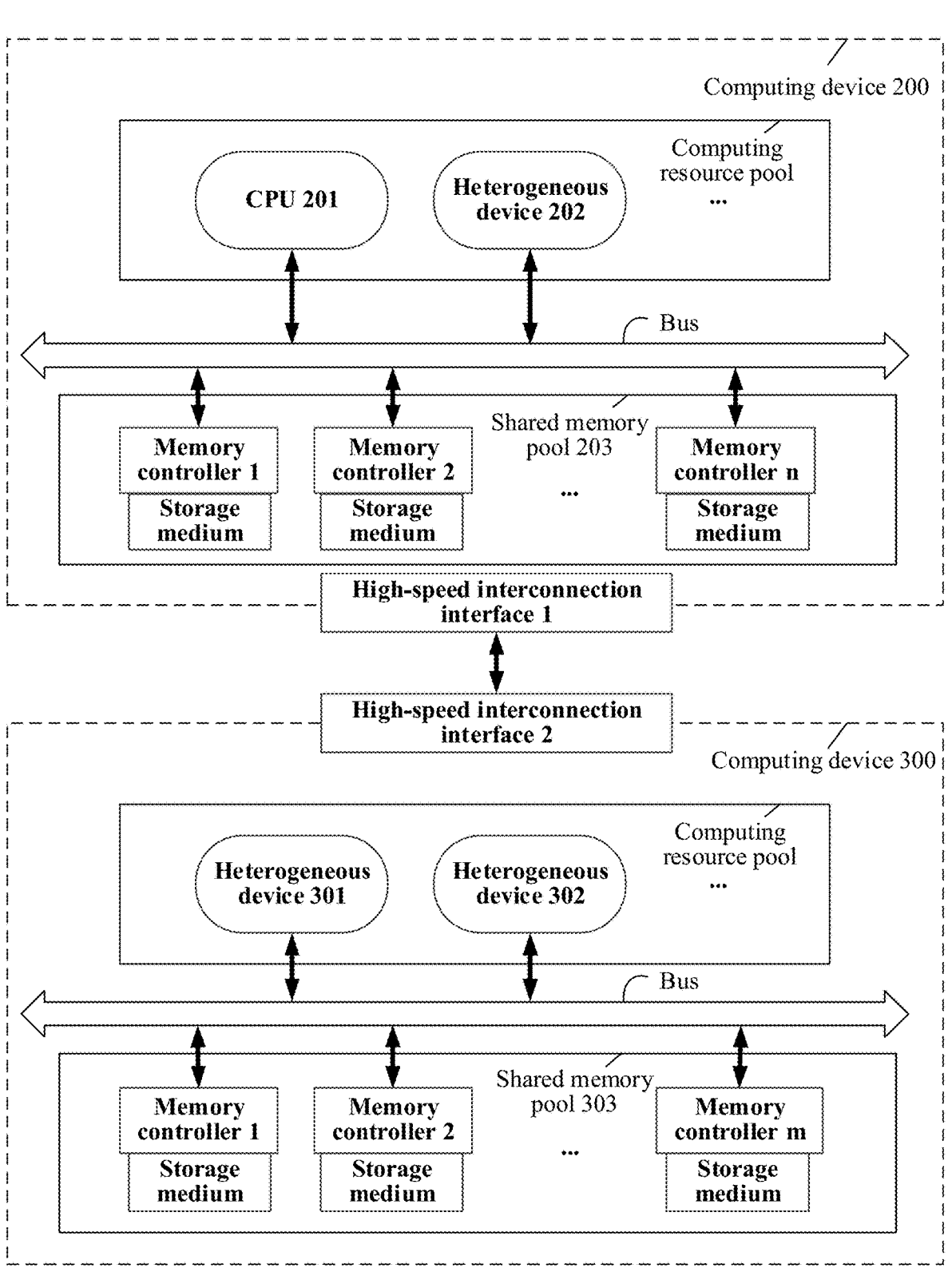
FIG. 6 is a diagram in which two computing devices are interconnected through a high-speed interface according to an embodiment.

For example, as shown in FIG. 6, the computing device 200 may be interconnected with the computing device 300 through a high-speed interconnection interface (for example, a high-speed interconnection interface 1 and a high-speed interconnection interface 2 in FIG. 6). The computing device 300 may have one or more heterogeneous devices (in FIG. 6, an example in which the computing device 300 includes a heterogeneous device 301 and a heterogeneous device 302 is used for description) and a shared memory pool 303. In addition, the shared memory pool 303 includes one or more shared memories, for example, may be implemented by using at least one memory controller and at least one storage medium (for example, a DIMM).

After the computing device 200 is interconnected with the computing device 300, each heterogeneous device (for example, the heterogeneous device 202) in the computing device 200 may access the shared memory pool 303 in the computing device 300 through the high-speed interconnection interface. Similarly, the heterogeneous device 301 (and another heterogeneous device) in the computing device 300 may access the shared memory pool 203 in the computing device 200 through the high-speed interconnection interface. In this way, the shared memory pool 203 in the computing device 200 and the shared memory pool 303 in the computing device 300 may form a unified memory pool with a logically larger capacity, and the unified memory pool is shared by the heterogeneous device in the computing device 200 and the heterogeneous device in the computing device 300. During actual application, when an available memory in the shared memory pool 203 in the computing device 200 is adequate, when processing a service, the computing device 200 may preferentially allocate a memory space from the shared memory pool 203 to the service. However, when the available memory in the shared memory pool 203 is small, the computing device 200 may process service data by using the shared memory pool 303 in the computing device 300.

In addition, the computing device 200 may further implement computing power expansion by using the heterogeneous device in the computing device 300, including expansion of a computing power specification, expansion of a computing power type, and the like. For example, when the computing device 200 needs to use three processors to process a service, the heterogeneous device 202, the heterogeneous device 301, and the heterogeneous device 302 may be used to sequentially process the service, to implement computing power expansion of the computing device 200.

For ease of further understanding the technical solutions in embodiments, the following describes embodiments with reference to a specific scenario of an image rendering service.

Figure 7A:
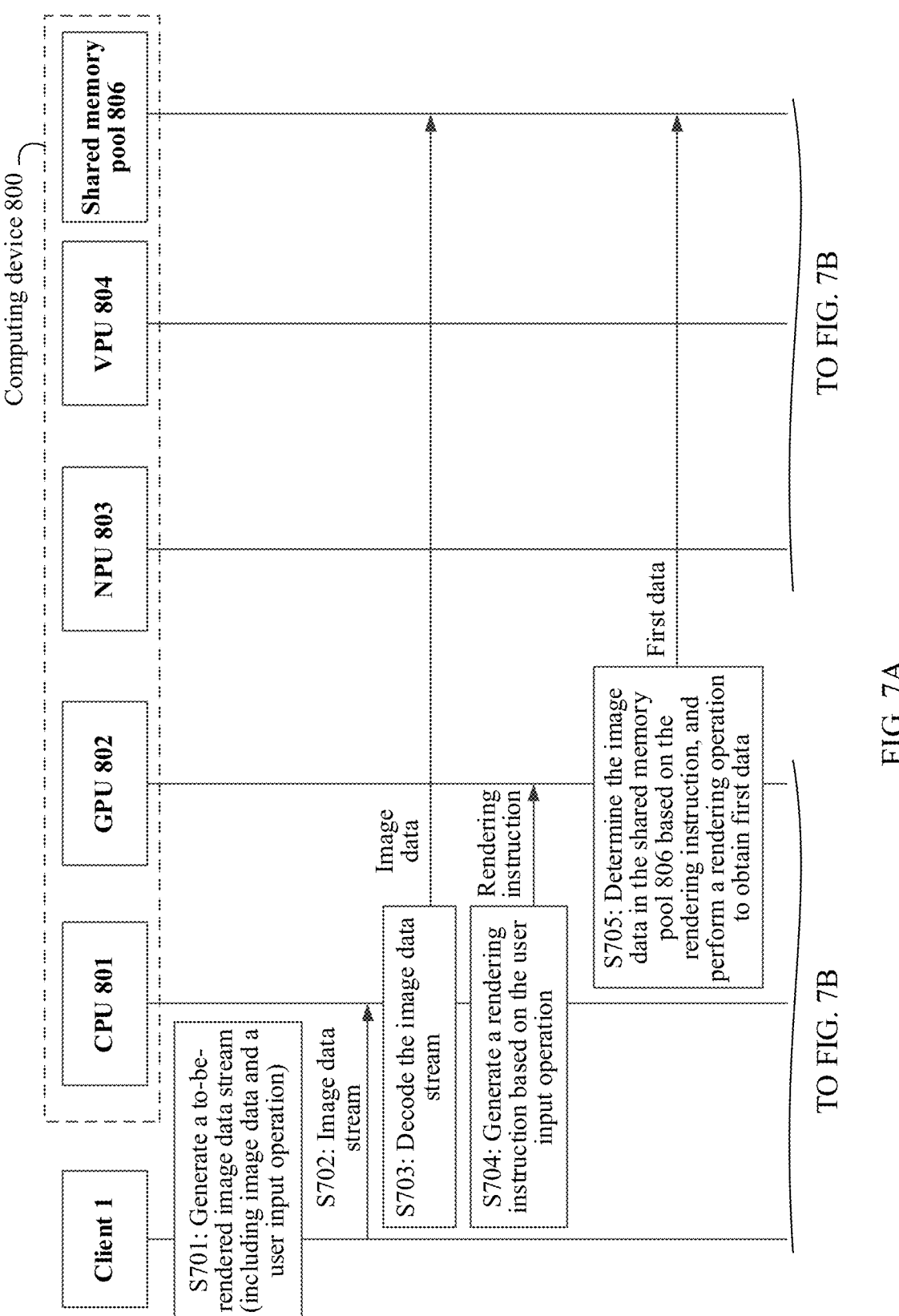
FIG. 7A and FIG. 7B are a schematic flowchart of a data processing method according to an embodiment.
Figure 7B:
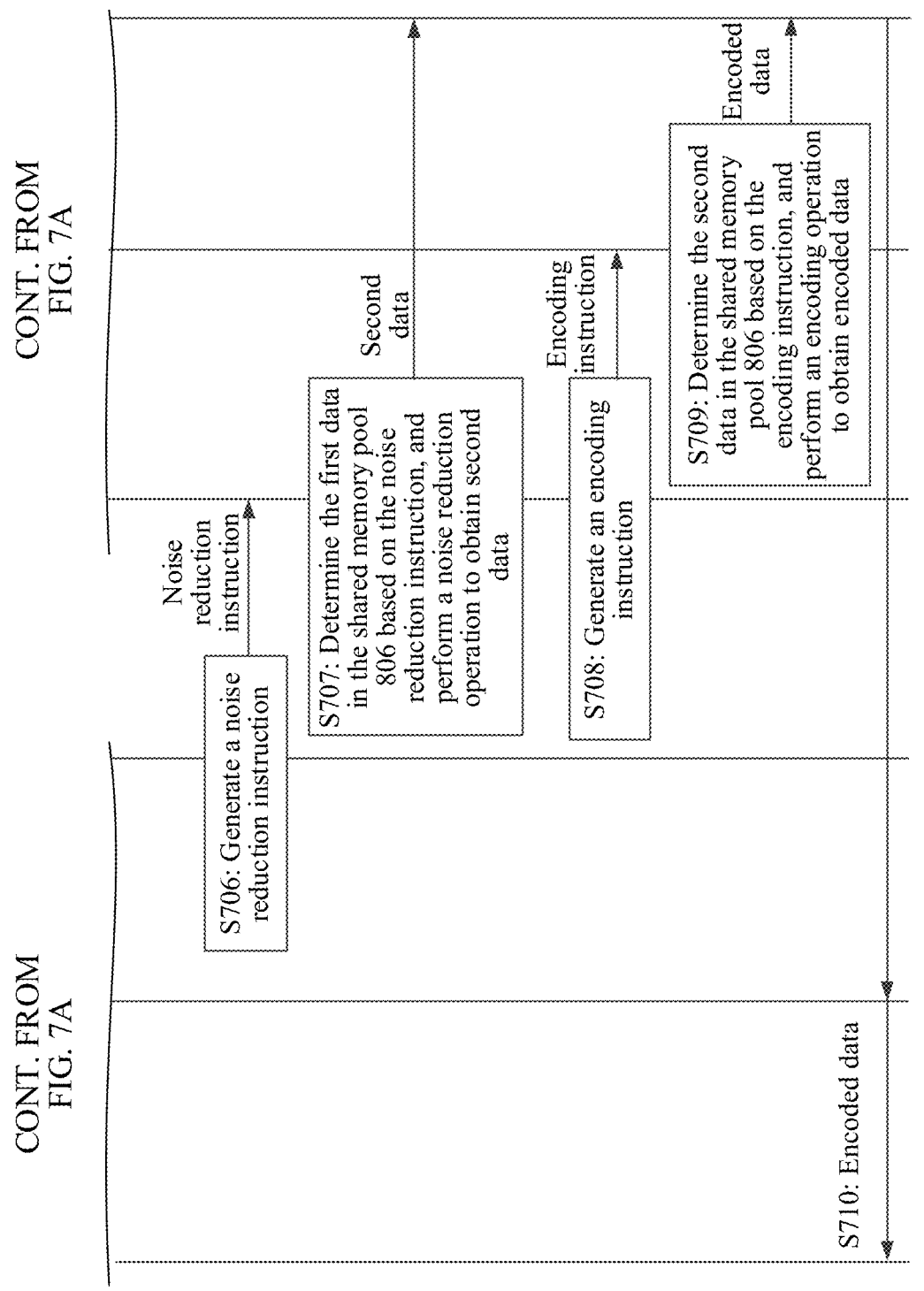
Figure 8:
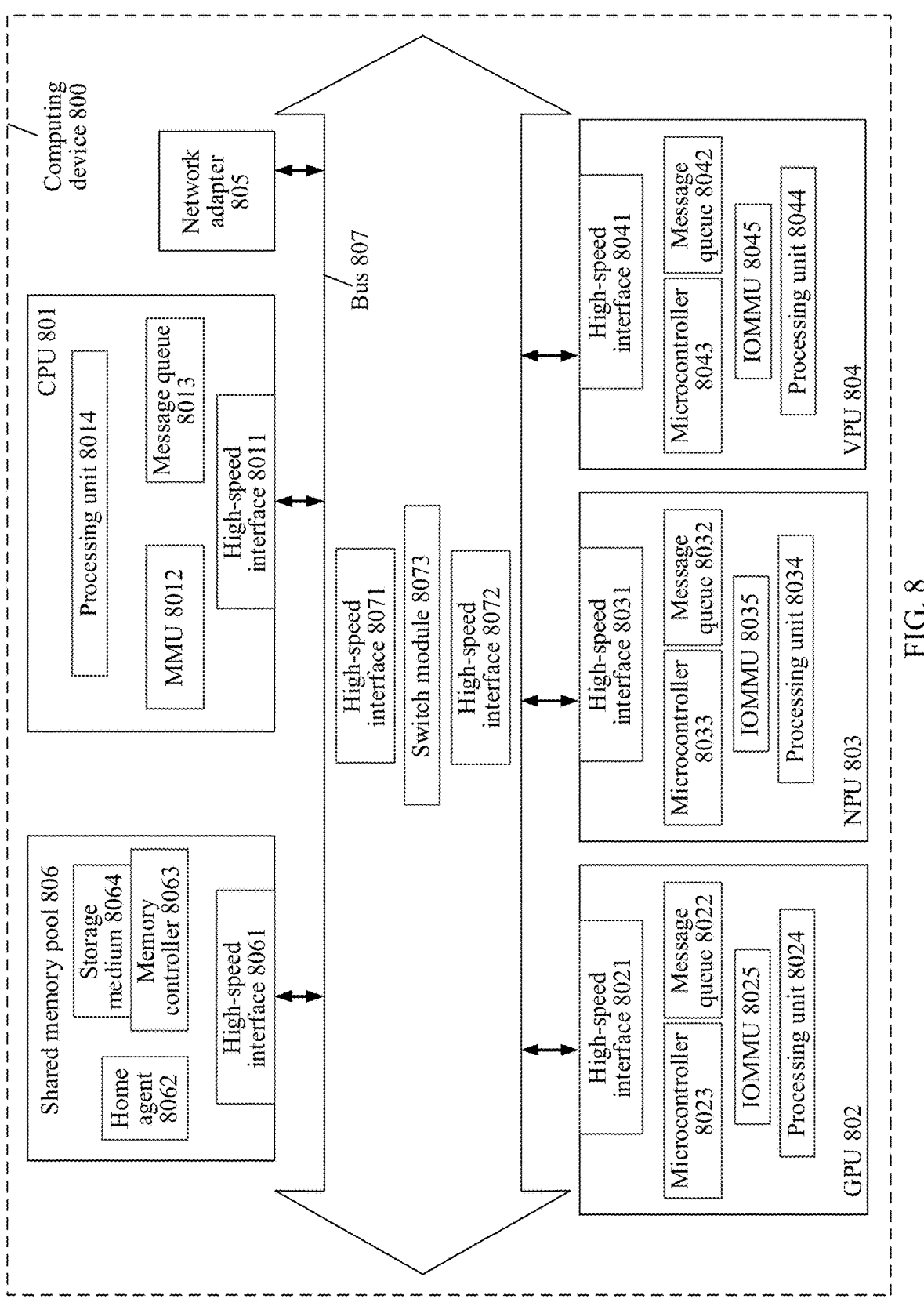
FIG. 8 is a diagram of a structure of a still yet computing device according to an embodiment.
Figure 9:
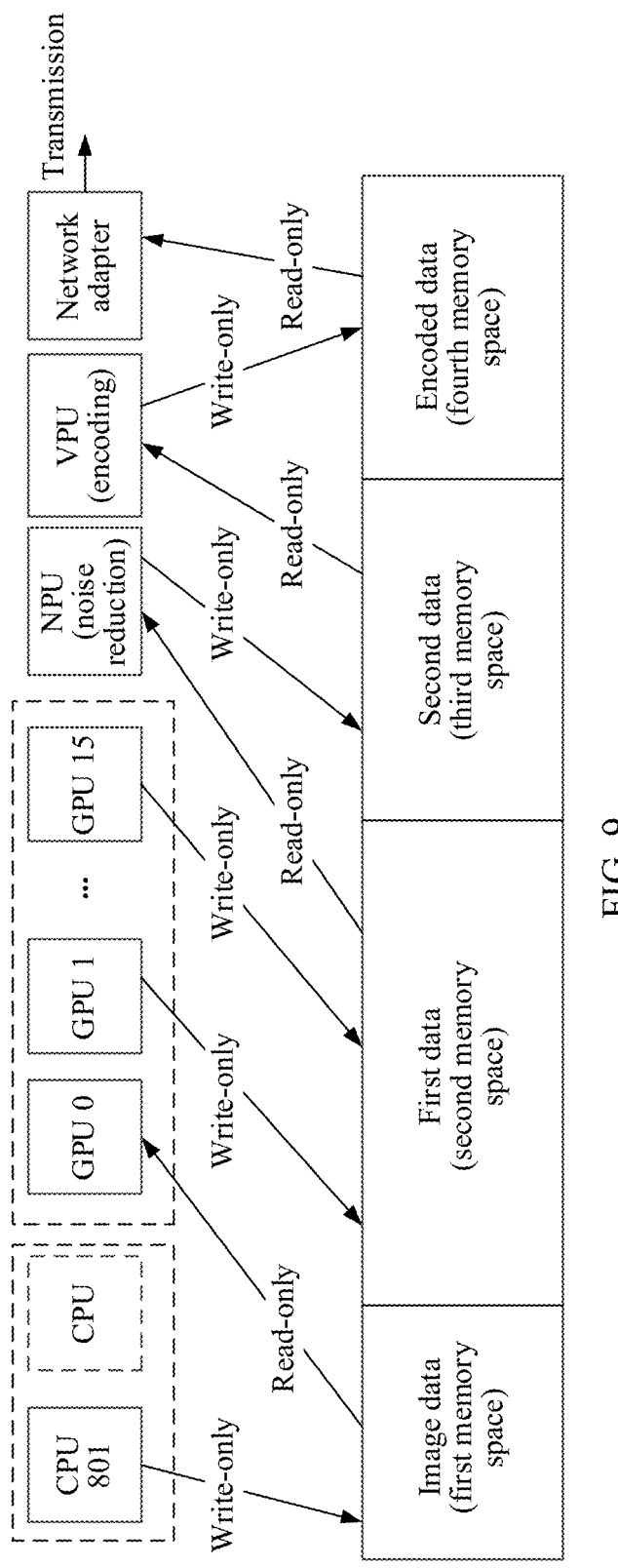
FIG. 9 is a diagram of processing an image rendering service according to an embodiment.

FIG. 7A and FIG. 7B are a schematic flowchart of a data processing method according to an embodiment. FIG. 8 is a diagram of a structure of another computing device according to an embodiment. FIG. 9 is a diagram of processing an image rendering service according to an embodiment. The data processing method shown in FIG. 7A and FIG. 7B may be applied to a computing device 800 shown in FIG. 8. In addition, the computing device 800 includes a CPU 801 and a plurality of heterogeneous devices: a GPU 802, an NPU 803, and a VPU 804. The CPU 801 and the plurality of heterogeneous devices in the computing device 800 are coupled to a shared memory pool 806 through a bus 807.

Based on the computing device 800 shown in FIG. 8, the data processing method shown in FIG. 7A and FIG. 7B may include the following steps.

S701: A client 1 encodes image data based on a user input operation, to generate a to-be-rendered image data stream, where the image data stream includes the image data and the user input operation.

S702: The client 1 sends the image data stream to the computing device 800.

In a possible scenario, a user may perform an operation based on an interaction interface provided by the client 1, for example, tap a control that is in the interaction interface and that is for controlling a player role in a game to move, so that the client 1 may encode, based on the input operation of the user, image data (for example, a game image) displayed on the current interaction interface, to generate the image data stream including the user input operation and the image data. Then, the client 1 may generate a cloud rendering request. The cloud rendering request carries the to-be-rendered image data stream, and sends the to-be-rendered image data stream to the computing device 800 deployed on a cloud, to request the computing device 800 to perform, based on the input operation of the user, a corresponding rendering process on the image data stream. For example, a location of the player role in a rendered game image has correspondingly changed based on the input operation of the user.

Correspondingly, the computing device 800 may receive, via a network adapter 805, the to-be-rendered image data stream sent by the client 1. The network adapter may also be referred to as a network interface controller (NIC), and is responsible for receiving data sent by an external device, sending data to the external device, or the like.

S703: The CPU 801 decodes the received to-be-rendered image data stream, to obtain the image data and the user input operation, and writes the image data into a first memory space that is in the shared memory pool 806.

During actual application, the CPU 801 may write, through a "write-only" permission, the image data obtained through decoding into the first memory space that is in the shared memory pool 806. The "write-only" permission means that a read/write permission of the CPU 801 on the image data obtained through decoding is that the CPU 801 can perform only a write operation on the image data.

During an implementation, as shown in FIG. 8, the CPU 801 may include a high-speed interface 8011, a memory management unit (MMU) 8012, a message queue 8013, and a processing unit 8014. The high-speed interface 8011 may be, for example, a serializer/deserializer (SerDes) interface. In addition, the processing unit 8014 may write, through the high-speed interface 8011, the image data into the first memory space that is in the shared memory pool 806. The first memory space may be allocated for storing the image data of the cloud rendering service requested by the client 1. The MMU 8012 may be configured to manage the shared memory pool 806, including capacity expansion, health status monitoring, memory resource allocation, and the like of the shared memory pool 806. The message queue 8013 may be configured to cache an operation instruction generated by the CPU 801, so that the processing unit 8014 delivers the operation instruction in the message queue 8013 to another processor.

The shared memory pool 806 includes a high-speed interface 8061 (where there may be one or more high-speed interfaces), a home agent unit 8062, at least one memory controller 8063, and a storage medium 8064. In this embodiment, when the shared memory pool 806 is constructed, the at least one memory controller 8063 and the storage medium 8064 may be linked to a bus 807, and a home agent unit 8062 is configured to: support implementing cache coherent non-uniform memory access (CC-NUMA) between a plurality of processors in the computing device 800. In other words, a plurality of memory units (for example, memory units constructed by a plurality of storage media) are connected to form a single memory with a larger capacity. In addition, the shared memory pool 806 may further provide the high-speed interface 8061 for external communication, to receive, through the high-speed interface 8061, data (for example, the foregoing image data) sent by a processor in the computing device 800, and write the data into the storage medium 8064 via the memory controller 8063.

Each processor in the computing device 800 is interconnected with the shared memory pool 806 through the bus 807. For example, the image data sent by the CPU 801 to the shared memory pool 806 may be transmitted to a shared memory in the shared memory pool 806 through the bus 807. As shown in FIG. 8, the bus 807 may include a high-speed interface 8071 connected to a processor, a high-speed interface 8072 configured to connect to the shared memory pool 806, and a switch unit 8073 configured to implement data exchange. In addition, in an actual scenario, a quantity of pieces of hardware that is responsible for implementing interconnection by a single switching unit 8073 is limited, and therefore, a quantity of switch units 8073 in the bus 807 may be determined based on a quantity of processors that are in the computing device 800 and that are connected to the bus 807 and a quantity of memory controllers 8063 in the shared memory pool 806.

S704: The CPU 801 generates a rendering instruction for the image data based on the user input operation and processing logic, and sends the rendering instruction to the GPU 802.

For example, the rendering instruction generated and sent by the CPU 801 may include information such as an address (which may be represented by using a pointer corresponding to a start address and a data length) in which the to-be-rendered image data is stored in the first memory space, and processing operations separately performed by the GPU 802, the NPU 803, and the VPU 804 that sequentially process the image data. Further, the rendering instruction may further include an address at which data generated by each processor by performing a corresponding operation is stored in a memory space that is in the shared memory pool 806.

S705: The GPU 802 determines the image data in the shared memory based on the rendering instruction, performs a rendering operation on the image data to obtain first data, and writes the first data into a second memory space that is in the shared memory pool 806.

During an implementation, the GPU 802 may receive, through the high-speed interface 8021, the rendering instruction sent by the CPU 801, cache the rendering instruction (or a storage location that is of the image data and that is indicated by the rendering instruction) via the message queue 8022, and parse the rendering instruction in the message queue 8022 via a microcontroller 8023, to determine the storage location of the image data and the processing operation that needs to be performed by the GPU 802 on the image data. Then, the processing unit 8024 may access the image data in the shared memory by using an input/output memory management unit (IOMMU) 8025, perform the rendering operation on the image data in the shared memory to obtain the first data, write the first data into the second memory space via the IOMMU 8025, and record an address at which the first data is stored in the second memory space, for example, record a start address and a data length of the first data when the first data is stored in the second memory space. The IOMMU 8025 may implement consistency between page tables of the GPU 802 and the CPU 801, so that the GPU 802 can access, by using a virtual address, the shared memory pool 806 managed by the MMU 8012 that is in the CPU 801. During actual application, a plurality of different processors in the computing device 800 may share a same page table; or based on an actual service requirement, a plurality of different processors may not share a same page table. For example, some processors have permission to read and write data in the shared memory pool 806, and another processor has permission to only read data in the shared memory pool 806. This is not limited in embodiments.

It should be noted that, in FIG. 7A and FIG. 7B, an example in which a single GPU 802 processes the image data is used for description. In an actual scenario, the computing device 800 may further use a plurality of GPUs to serially or concurrently process the image data. For example, refer to FIG. 9. The computing device 800 may include 16 GPUs: a GPU 0 to a GPU 15. In addition, the computing device may accelerate processing of the image data by using the 16 GPUs. For example, the CPU 801 may send a rendering instruction to the GPU 0, where the rendering instruction may include an address at which the image data is stored in the first memory space and an operation that needs to be performed by the GPU 0 to the GPU 15. In this way, the GPU 0 may access and obtain the image data in the first memory space through "read-only"

permission, provide the image data for a plurality of remaining GPUs (for example, the GPU 1 to the GPU 15), and indicate the plurality of remaining GPUs to concurrently perform a corresponding rendering operation on the image data, and writes, in a "write-only" manner, the generated first data into the second memory space specified by the CPU 801. In another implementation, the CPU 801 may alternatively send a rendering instruction to each GPU, and indicate each GPU to perform a corresponding rendering operation on different image data stored in the first memory space.

S706: The GPU 802 generates a noise reduction instruction, and sends the noise reduction instruction to the NPU 803.

For example, the GPU 802 may determine, in a sequence of processors that process the image data and that is carried in the rendering instruction, that a next processor that processes the image data is the NPU 803. Therefore, the GPU 802 may control the NPU 803 to continue to process the first data in the second memory space.

During an implementation, the GPU 802 may generate and send the noise reduction instruction to the NPU 803, so that the NPU 803 performs an AI noise reduction process on the first data. The noise reduction instruction generated by the GPU 802 may carry information such as the address at which the first data is stored in the second memory space, and processing operations separately performed by the NPU 803 and the VPU 804 that sequentially process the image data. Further, the noise reduction instruction may further include an address at which data generated when the NPU 803 and the VPU 804 perform corresponding processing operations is stored in the third memory space that is in the shared memory pool 806.

S707: The NPU 803 determines the first data in the second memory space based on the noise reduction instruction, performs a noise reduction operation on the first data to obtain second data, and writes the second data into the third memory space that is in the shared memory pool 806.

The NPU 803 may parse out, from the received noise reduction instruction, an address at which the first data is stored in the second memory space, and access the first data from the second memory space in a "read-only" manner, to process the first data based on the noise reduction operation indicated by the noise reduction instruction, to obtain the second data. Then, the NPU 803 may write the second data into the third memory space in a "write-only" manner based on an address, indicated by the noise reduction instruction, of the third memory space, as shown in FIG. 9.

In an implementation, similar to the GPU 802, the NPU 803 may include a high-speed interface 8031, a message queue 8032, a microcontroller 8033, a processing unit 8034, and an IOMMU 8035.

The NPU 803 may receive the noise reduction instruction through the high-speed interface 8031, cache the noise reduction instruction (or a storage location that is of the first data and that is indicated by the noise reduction instruction) via the message queue 8032, parse, via the microcontroller 8033, the noise reduction instruction that is in the message queue 8032, and determine the storage location of the first data in the second memory space and the processing operation that needs to be performed by the NPU 803 on the first data as the noise reduction operation. Then, the processing unit 8034 may access the first data in the shared memory by using the IOMMU 8035, and perform the noise reduction operation on the first data in the shared memory. For example, the processing unit 8034 may remove noise data from the first data, perform super-resolution processing (construct high-resolution image data based on low-resolution image data) on de-noised first data, to obtain the second data, write the second data into the third memory space via the IOMMU 8035, and record a location in which the second data is stored in the third memory space.

S708: The NPU 803 generates an encoding instruction, and sends the encoding instruction to the VPU 804.

The NPU 803 may determine, in a sequence of processors that process the image data and that is carried in the noise reduction instruction, that a next processor that continues to process the image data is the VPU 804. Therefore, the NPU 803 may control the VPU 804 to continue to process the image data.

During an implementation, the NPU 803 may generate the encoding instruction and send the encoding instruction to the VPU 804, so that the NPU 803 encodes the second data. The encoding instruction generated by the NPU 803 may carry information such as an address at which the second data is stored in the third memory space and a processing operation to be performed by the VPU 804. Further, the encoding instruction may further include an address at which data generated when the VPU 804 performs the corresponding processing operation is stored in a fourth memory space that is in the shared memory pool 806.

S709: The VPU 804 determines, based on the encoding instruction, the second data stored in the third memory space, performs an encoding operation on the second data to obtain encoded data, and writes the encoded data into the fourth memory space that is in the shared memory pool 806.

The VPU 804 may parse out, from the received encoding instruction, an address at which the second data is stored in the third memory space, and access the second data in the third memory space in a "read-only" manner, to process the second data based on the encoding operation indicated by the encoding instruction, to obtain the encoded data. Then, the VPU 804 may write the encoded data into the fourth memory space in the "write-only" manner based on the address, indicated by the encoding instruction, of the fourth memory space, as shown in FIG. 9.

For example, the VPU 804 may include a high-speed interface 8041, a message queue 8042, a microcontroller 8043, a processing unit 8044, and an IOMMU 8045, determine the second data in the fourth memory space, perform a corresponding encoding operation on the second data to obtain encoded data, and continue to cache the encoded data in the fourth memory space that is in the shared memory pool 806. For an implementation in which the VPU 804 performs the encoding operation on the second data based on the encoding instruction, refer to related descriptions of the foregoing process in which the NPU 803 performs the noise reduction operation on the first data based on the noise reduction instruction. Details are not described herein again.

S710: The CPU 801 feeds back the encoded data in the fourth memory space to the client 1 via the network adapter 805.

For example, the CPU 801 may send a transmission instruction to the network adapter 805, where the transmission instruction may include the address at which the encoded data is stored in the fourth memory space, so that the network adapter 805 may obtain the encoded data from the fourth memory space in the "read-only" manner based on the transmission instruction, and send the encoded data to the client 1, as shown in FIG. 9.

In this way, the computing device 800 may implement an image rendering service requested by the client 1, and provide an image rendering service for the client 1. The image rendering service may be a cloud service, or may be a local service. This is not limited in embodiments.

It should be noted that, in embodiments shown in FIG. 7A and FIG. 7B, although the NPU 803 and the VPU 804 receive the operation instruction from a previous processor that processes service data, and determine, based on the received operation instruction, a data storage address and an operation that needs to be performed, address information and operation information included in the operation instruction received by the NPU 803 and the VPU 804 are both from the rendering instruction of the CPU 801. In this case, actually, the CPU 1 coordinates and notifies the GPU 802, the NPU 803, and the VPU 804 to process and store the service data. In this way, a quantity of times of interaction between the CPU 801 and each of the GPU 802, the NPU 803, and the VPU 804 can be reduced, so that load of the CPU 801 can be reduced, and management and control performance of the CPU 801 can be improved.

In another embodiment, an instruction received by a heterogeneous processor such as the GPU 802, the NPU 803, or the VPU 804 may alternatively be directly delivered by the CPU 801. For ease of understanding, descriptions are provided below in detail with reference to FIG. 8, FIG. 9, and FIG. 10A and FIG. 10B.

Figure 10A:
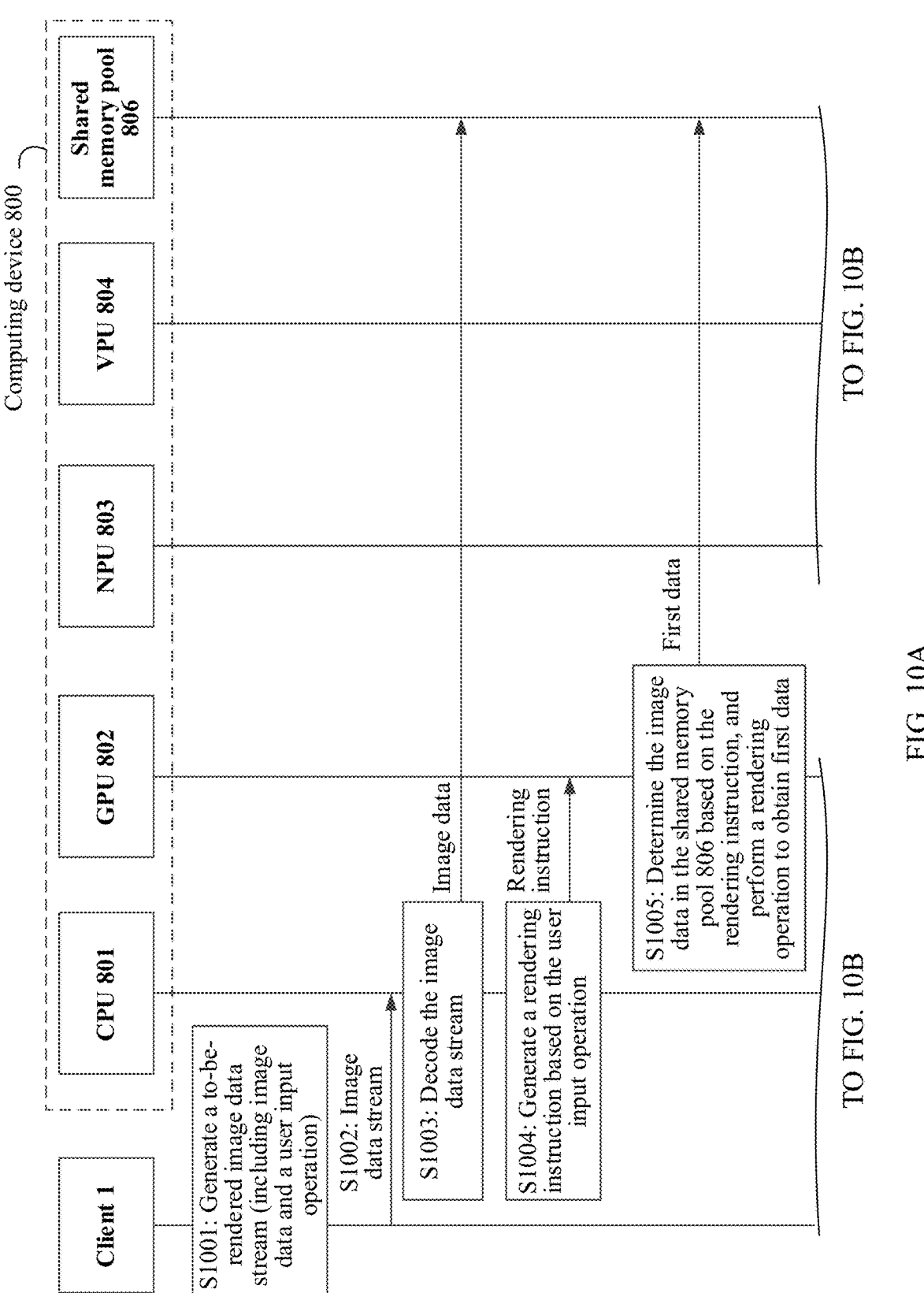
FIG. 10A and FIG. 10 are a schematic flowchart of another data processing method according to an embodiment.
Figure 10B:
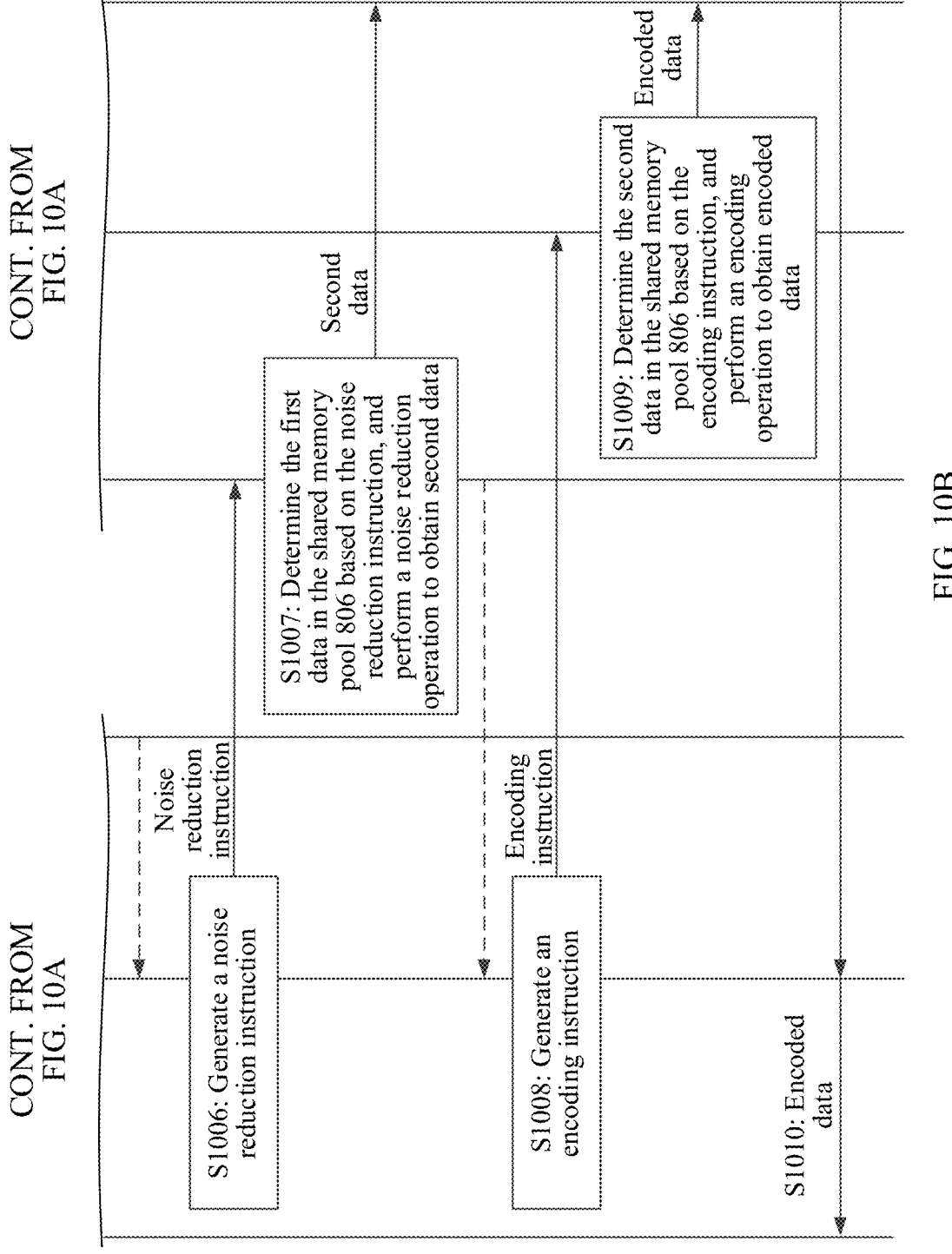

FIG. 10A and FIG. 10B are a schematic flowchart of another data processing method according to an embodiment. The method may include the following steps.

S1001: A client 1 encodes image data based on a user input operation, to generate a to-be-rendered image data stream, where the image data stream includes the image data and the user input operation.

S1002: The client 1 sends the image data stream to a computing device 800.

S1003: The CPU 801 decodes the received to-be-rendered image data stream, to obtain the image data and the user input operation, and writes the image data into a first memory space that is in a shared memory pool 806.

In this embodiment, for an implementation process of step S1001 to step S1003, refer to related descriptions of step S701 to step S703 in the embodiment shown in FIG. 7A and FIG. 7B. Details are not described herein again.

S1004: A CPU 801 generates a rendering instruction for the image data based on the user input operation and processing logic, and sends the rendering instruction to a GPU 802.

Different from the embodiment shown in FIG. 7A and FIG. 7B, in this embodiment, the CPU 801 controls, by delivering instructions to heterogeneous processors one by one, the heterogeneous processors to perform corresponding operations. Therefore, the rendering instruction generated by the CPU 801 for the GPU 802 may include an address (which may be represented by a pointer corresponding to a start address and a data length) in which to-be-rendered image data is stored in the first memory space, a rendering operation that needs to be performed by the GPU 802 on the image data, and a second memory space that is stored in the shared memory pool 806 and that is of data generated by the GPU 802 by performing the rendering operation.

S1005: The GPU 802 determines the image data in the shared memory pool based on the rendering instruction, performs the rendering operation on the image data to obtain first data, and writes the first data into the second memory space that is in the shared memory pool 806.

In this embodiment, after performing the rendering operation and obtaining the first data, the GPU 802 may notify the CPU 801 of the first data, so that the CPU 801 indicates another heterogeneous processor to continue to process the first data.

S1006: The CPU 801 generates a noise reduction instruction, and sends the noise reduction instruction to an NPU 803.

The noise reduction instruction generated by the CPU 801 may include an address (which may be represented by a pointer corresponding to a start address and a data length of the first data) in which the first data is stored in the second memory space, a noise reduction operation that needs to be performed by the NPU 803 on the first data, and a third memory space that is stored in the shared memory pool 806 and that is of data generated by the NPU 803 by performing the noise reduction operation.

S1007: The NPU 803 determines the first data in the second memory space based on the noise reduction instruction, performs the noise reduction operation on the first data to obtain second data, and writes the second data into the third memory space that is in the shared memory pool 806.

After performing the noise reduction operation and obtaining the second data, the NPU 803 may notify the CPU 801 of the second data, so that the CPU 801 indicates another heterogeneous processor to continue to process the second data.

S1008: The CPU 801 generates an encoding instruction, and sends the encoding instruction to a VPU 804.

The encoding instruction generated by the CPU 801 may include an address (which may be represented by a pointer corresponding to a start address and a data length of the second data) in which the second data is stored in the third memory space, an encoding operation that needs to be performed by the VPU 804 on the second data, and a fourth memory space that is stored in the shared memory pool 806 and that is of data generated by the VPU 804 by performing the encoding operation.

S1009: The VPU 804 determines, based on the encoding instruction, the second data stored in the third memory space, performs the encoding operation on the second data to obtain the encoded data, and writes the encoded data into the fourth memory space that is in the shared memory pool 806.

After completing the encoding operation and obtaining the encoded data, the VPU 804 may notify the CPU 801 of the encoded data.

S1010: The CPU 801 feeds back the encoded data in the fourth memory space to the client 1 via a network adapter 805.

For example, the CPU 801 may send a transmission instruction to the network adapter 805, where the transmission instruction may include an address at which the encoded data is stored in the fourth memory space, so that the network adapter 805 may obtain the encoded data from the fourth memory space in a "read-only" manner based on the transmission instruction, and send the encoded data to the client 1, as shown in FIG. 9.

In this embodiment, the CPU 801 may sequentially control a process of processing the image data by delivering the instructions to the GPU 802, the NPU 803, the VPU 804, and the network adapter 805 one by one. For an implementation in which the heterogeneous processor such as the GPU 802, the NPU 803, or the VPU 804 performs a corresponding operation and a data storage process based on a received instruction, refer to related descriptions in the embodiment shown in FIG. 7A and FIG. 7B. Details are not described herein again.

In addition, embodiments further provide a data processing system. The data processing system may include one or more computing devices. The computing device in the data processing system may be any one of the computing devices in FIG. 2 to FIG. 6 and FIG. 8, or may be another applicable computing device that is adjusted based on the foregoing computing device example. This is not limited in embodiments.

Optionally, the data processing system may form a computing device cluster including one or more computing devices. Alternatively, the data processing system may be deployed on one backplane, and a plurality of memory modules, at least one central processing unit, and at least one heterogeneous device that implement a shared memory pool may be integrated on the backplane. During actual application, when the data processing system is deployed on the backplane, the backplane may further include more components with other functions, and components on the backplane may be coupled through an interface.

In addition, embodiments further provide a computer-readable storage medium. The computer-readable storage medium stores instructions. When the instructions are run on a computing device, the computing device is enabled to perform the method performed by the computing device in the foregoing embodiments.

In addition, embodiments further provide a computer program product. When the computer program product is executed by the computing device in the foregoing embodiments, the computing device performs the foregoing data processing method. The computer program product may be a software installation package. When any method of the foregoing data processing method needs to be used, the computer program product may be downloaded and executed on a computer.

Based on the description of the foregoing implementations, a person skilled in the art may clearly understand that this disclosure may be implemented by software in addition to necessary universal hardware, or by dedicated hardware, including a dedicated integrated circuit, a dedicated CPU, a dedicated memory, a dedicated component, and the like. Generally, any function that can be performed by a computer program can be easily implemented by using corresponding hardware. Moreover, a hardware structure used to achieve a same function may be in various forms, for example, in a form of an analog circuit, a digital circuit, or a dedicated circuit. However, software program implementation may be a better implementation in more cases. Based on such an understanding, the technical solutions may be implemented in a form of a software product. The computer software product is stored in a readable storage medium, for example, a floppy disk, a USB flash drive, a removable hard disk, a ROM, a RAM, a magnetic disk, or an optical disc of a computer, and includes several instructions for instructing a computer device (which may be a personal computer, a training device, a network device, or the like) to perform the method in embodiments.

All or some of foregoing embodiments may be implemented by software, hardware, firmware, or any combination thereof. When the software is used for implementation, all or a part of the implementation may be implemented in a form of a computer program product.

The computer program product includes one or more computer instructions. When the computer program instructions are loaded and executed on a computer, the procedures or functions according to embodiments are all or partially generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from a website, a computer, a training device, or a data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium that can be stored by a computer, or a data storage device, such as a training device or a data center, integrating one or more usable media. The usable medium may be a magnetic medium (which is, for example, a floppy disk, a hard disk, or a magnetic tape), an optical medium (which is, for example, a digital versatile disc), a semiconductor medium (which is, for example, a solid-state drive (SSD)), or the like.

What is claimed is:

1. A computing device comprising:
a shared memory pool comprising shared memories;
a central processing unit configured to:
    divide the shared memory pool into memory spaces comprising a first memory space, a second memory space, a third memory space, and a fourth memory space;
    store, in the first memory space, first to-be-processed data that is from a client and that is associated with a service;
    send a first notification comprising a first address of the first to-be-processed data in the first memory space and comprising a first operation to be performed on the first to-be-processed data;
    store, in the third memory space, second to-be-processed data that is from the client and that is associated with the service;
    send a second notification comprising a second address of the second to-be-processed data in the third memory space, a second operation to be performed on the second to-be-processed data, and a first indication that the fourth memory space is a second storage location of second data generated through the second operation; and
    send a third notification comprising a third operation to be performed on first data and the second data and comprising a second indication to send third data generated through the third operation to an external computing device; and
at least one heterogeneous device comprising:
    a first heterogeneous device configured to:
        receive the first notification from the central processing unit;
        perform the first operation on the first to-be-processed data in the first memory space to obtain the first data; and
        store the first data in the second memory space;
    a second heterogeneous device configured to:
        receive the second notification from the central processing unit;
        perform the second operation on the second to-be-processed data in the third memory space to obtain the second data; and
        store the second data in the fourth memory space; and
    a third heterogeneous device configured to:
        connect to the external computing device through a network;
        receive the third notification from the central processing unit;

perform the third operation on the first data in the second memory space and the second data in the fourth memory space to obtain the third data; and
        send the third data to the external computing device.

2. The computing device of claim 1, wherein the first notification further comprises an indication that the second memory space is a first storage location of the first data.

3. The computing device of claim 1, wherein the first heterogeneous device and the second heterogeneous device are graphics processing units (GPUs).

4. The computing device of claim 1, wherein the third heterogeneous device is a graphics processing unit (GPU), a neural processing unit (NPU), or a video processing unit (VPU).

5. The computing device of claim 1, wherein the third heterogeneous device is a network adapter.

6. A method comprising:
dividing, by a central processing unit of a computing device, a shared memory pool of the computing device into memory spaces comprising a first memory space, a second memory space, a third memory space, and a fourth memory space;
storing, by the central processing unit in the first memory space, first to-be-processed data that is from a client and that is associated with a service;
sending, by the central processing unit, a first notification comprising a first address of the first to-be-processed data in the first memory space and comprising a first operation to be performed on the first to-be-processed data;
receiving, by a first heterogeneous device of the computing device and from the central processing unit, the first notification;
performing, by the first heterogeneous device, the first operation on the first to-be-processed data in the first memory space to obtain first data;
storing, by the first heterogeneous device, the first data in the second memory space;
storing, by the central processing unit in the third memory space, second to-be-processed data that is from the client and that is associated with the service;
sending, by the central processing unit and to a second heterogeneous device of the computing device, a second notification comprising a second address of the second to-be-processed data in the third memory space, a second operation to be performed on the second to-be-processed data, and a first indication that the fourth memory space is a second storage location of second data generated through the second operation;
receiving, by the second heterogeneous device and from the central processing unit, the second notification;
performing, by the second heterogeneous device, the second operation on the second to-be-processed data in the third memory space to obtain the second data;
storing the second data in the fourth memory space;
providing, by the central processing unit, a third address of the second memory space and a fourth address of the fourth memory space for a third heterogeneous device of the computing device;
sending, by the central processing unit and to the third heterogeneous device, a third notification comprising a third operation to be performed on the first data and the second data and comprising a second indication to send third data generated through the third operation to an external computing device;
receiving, by the third heterogeneous device and from the central processing unit, the third notification;

performing, by the third heterogeneous device, the third operation on the first data in the second memory space and the second data in the fourth memory space to obtain the third data; and sending, by the third heterogeneous device, the third data to the external computing device.

7. The method of claim 6, wherein the first notification further comprises an indication that the second memory space is a first storage location of the first data.

8. The method of claim 6, wherein the first heterogeneous device and the second heterogeneous device are graphics processing units (GPUs).

9. The method of claim 6, wherein the third heterogeneous device is a graphics processing unit (GPU), a neural processing unit (NPU), or a video processing unit (VPU).

10. The method of claim 6, wherein the third heterogeneous device is a network adapter.

11. A non-transitory computer-readable storage medium storing instructions that, when executed by one or more processors, cause a computing device to:

divide, by a central processing unit of the computing device, a shared memory pool into memory spaces comprising a first memory space, a second memory space, a third memory space, and a fourth memory space;

store, by the central processing unit in the first memory space, first to-be-processed data that is from a client and that is associated with a service;

send, by the central processing unit, a first notification comprising an address of the first to-be-processed data in the first memory space and comprising a first operation to be performed on the first to-be-processed data;

receive, by a first heterogeneous device of the computing device and from the central processing unit, the first notification;

perform, by the first heterogeneous device, the first operation on the first to-be-processed data in the first memory space to obtain first data;

store, by the first heterogeneous device, the first data in the second memory space;

store, by the central processing unit in the third memory space, second to-be-processed data that is from the client and that is associated with the service;

send, by the central processing unit and to a second heterogeneous device of the computing device, a second notification comprising a second address of the second to-be-processed data in the third memory space, a second operation to be performed on the second to-be-processed data, and a first indication that the fourth memory space is a second storage location of second data generated through the second operation;

receive, by the second heterogeneous device and from the central processing unit, the second notification;

perform, by the second heterogeneous device, the second operation on the second to-be-processed data in the third memory space to obtain the second data;

store, by the second heterogeneous device, the second data in the fourth memory space;

provide, by the central processing unit, a third address of the second memory space and a fourth address of the fourth memory space for a third heterogeneous device of the computing device;

send, by the central processing unit and to the third heterogeneous device, a third notification comprising a third operation to be performed on the first data and the second data and comprising a second indication to send third data generated through the third operation to an external computing device;

receive, by the third heterogeneous device and from the central processing unit, the third notification;

perform, by the third heterogeneous device, the third operation on the first data in the second memory space and the second data in the fourth memory space to obtain the third data; and send, by the third heterogeneous device, the third data to the external computing device.

12. The non-transitory computer-readable storage medium of claim 11, wherein the first notification indicates the second memory space is a storage location of the first data.

13. The non-transitory computer-readable storage medium of claim 11, wherein the first heterogeneous device and the second heterogeneous device are graphics processing units (GPUs).

14. The non-transitory computer-readable storage medium of claim 11, wherein the third heterogeneous device is a graphics processing unit (GPU), a neural processing unit (NPU), or a video processing unit (VPU).

15. The non-transitory computer-readable storage medium of claim 11, wherein the third heterogeneous device is a network adapter.

* * * * *